(12) United States Patent
Jones et al.

(10) Patent No.: US 9,329,286 B2
(45) Date of Patent: May 3, 2016

(54) SEISMIC SURVEY USING AN AUGMENTED REALITY DEVICE

(71) Applicant: WesternGeco, L.L.C., Houston, TX (US)

(72) Inventors: Robert Hughes Jones, Yokohama (JP); Emmanuel Coste, Houston, TX (US); Guillaume Daniel Tamboise, Houston, TX (US); Dorin Rosu, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 14/504,481

(22) Filed: Oct. 2, 2014

(65) Prior Publication Data

US 2015/0100235 A1   Apr. 9, 2015

Related U.S. Application Data

(60) Provisional application No. 61/886,412, filed on Oct. 3, 2013.

(51) Int. Cl.
| | |
|---|---|
| *G01V 1/00* | (2006.01) |
| *G01V 1/38* | (2006.01) |
| *G06T 19/00* | (2011.01) |
| *G01C 21/00* | (2006.01) |
| *G01V 1/34* | (2006.01) |

(52) U.S. Cl.
CPC ........... *G01V 1/00* (2013.01); *G01V 1/003* (2013.01); *G01V 1/34* (2013.01); *G01V 2210/74* (2013.01)

(58) Field of Classification Search
CPC ........... G01V 1/00; G01V 1/003; G01V 1/34; G01V 2210/74; G01C 21/00
USPC ........................................... 701/468
See application file for complete search history.

(56) References Cited

U.S. PATENT DOCUMENTS

| | | | |
|---|---|---|---|
| 8,104,346 B2 | 1/2012 | Paulson | |
| 2006/0232499 A1 | 10/2006 | Ebersole et al. | |
| 2008/0082701 A1* | 4/2008 | Pavel et al. .................... | 710/10 |
| 2009/0289955 A1 | 11/2009 | Douris et al. | |
| 2012/0001939 A1 | 1/2012 | Sandberg | |
| 2012/0050144 A1 | 3/2012 | Morlock | |
| 2013/0241955 A1 | 9/2013 | Tamaru | |

OTHER PUBLICATIONS

International search report and written opinion for the equivalent PCT patent application No. PCT/UW2014/058956 issued on Jan. 21, 2015.

\* cited by examiner

*Primary Examiner* — Rodney Butler
*Assistant Examiner* — Anne Mazzara

(57) ABSTRACT

Various implementations described herein are directed to a seismic survey using an augmented reality device. In one implementation, a method may include determining current location data of an augmented reality (AR) device in a physical environment. The method may also include receiving placement instructions for a first seismic survey equipment in the physical environment based on the current location data. The method may further include displaying the placement instructions in combination with a view of the physical environment on the AR device.

12 Claims, 17 Drawing Sheets

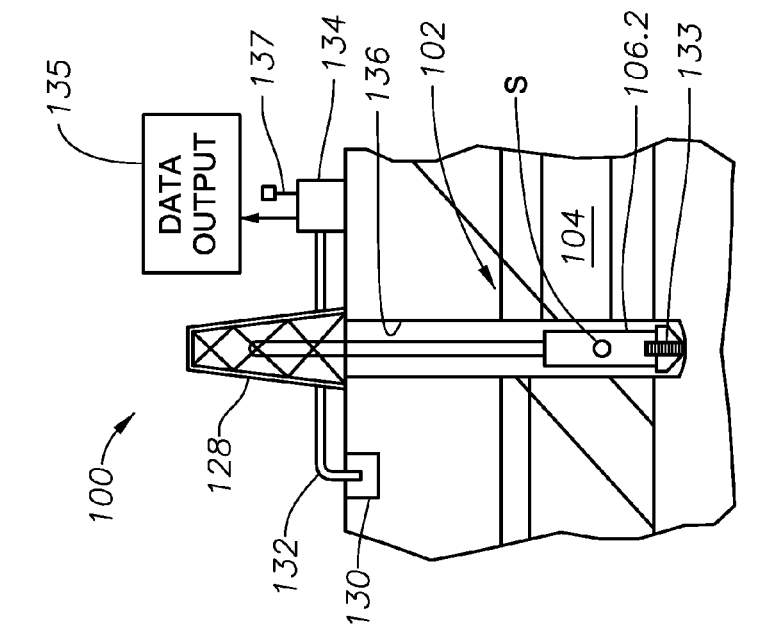
FIG. 1.2
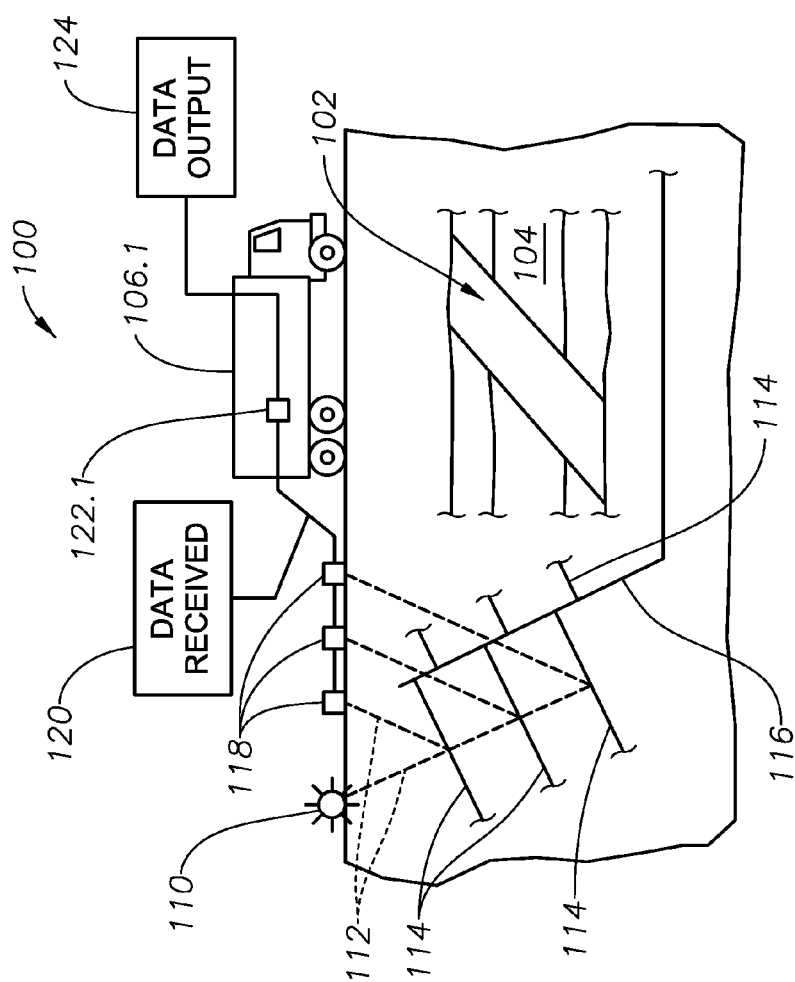
FIG. 1.1

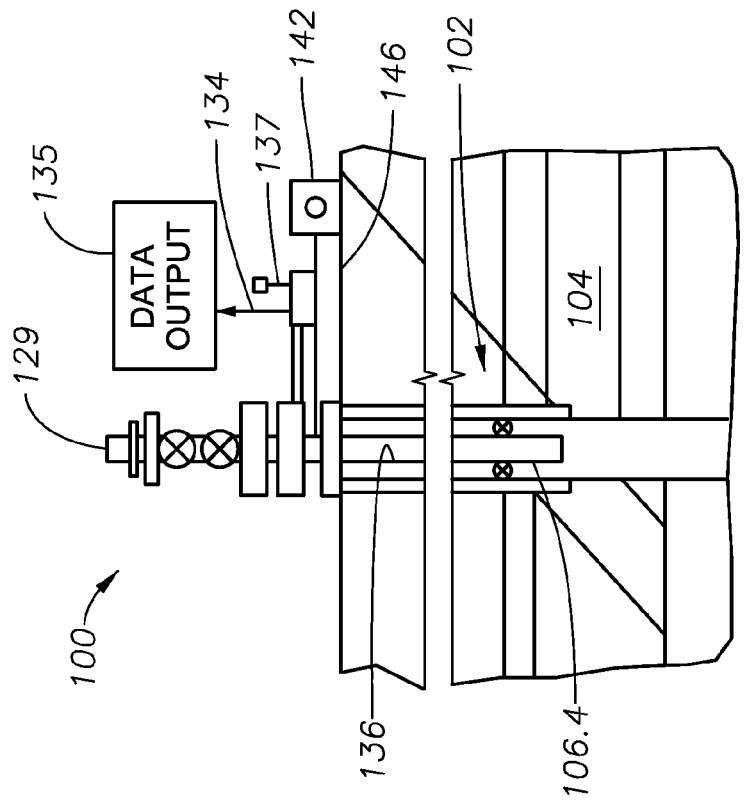
FIG. 1.4
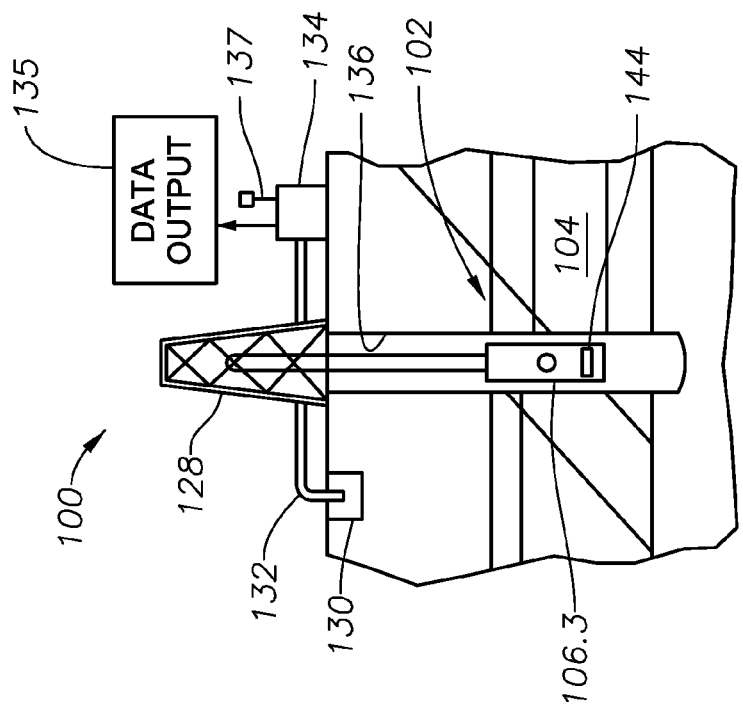
FIG. 1.3

SEISMIC SURVEY USING AN AUGMENTED REALITY DEVICE

CROSS-REFERENCE TO RELATED APPLICATIONS

This application claims benefit of U.S. provisional patent application Ser. No. 61/886,412, filed Oct. 3, 2013 and titled AUGMENTED REALITY FOR SEISMIC OPERATIONS, the entire disclosure of which is herein incorporated by reference.

BACKGROUND

Seismic exploration may involve surveying subterranean geological formations for hydrocarbon deposits. A seismic survey may involve deploying survey equipment, such as seismic source(s) and seismic sensors, at predetermined locations. The sources may generate seismic waves, which propagate into the geological formations, creating pressure changes and vibrations along their way. Changes in elastic properties of the geological formation may scatter the seismic waves, changing their direction of propagation and other properties. Part of the energy emitted by the sources may reach the seismic sensors. Some seismic sensors may be sensitive to pressure changes (hydrophones), others to particle motion (e.g., geophones), and industrial surveys may deploy one type of sensors or both. In response to the detected seismic events, the sensors may generate electrical signals to produce seismic data. Analysis of the seismic data can then indicate the presence or absence of probable locations of hydrocarbon deposits.

In one scenario, deploying survey equipment in a production field may be a time-consuming process, depending on the conditions of the field, weather conditions, and/or the like. Similarly, the recovery and/or repair of such equipment in the field may be slowed by the conditions of the field, lack of knowledge of the repairs needed, and/or the like.

SUMMARY

Described herein are implementations of various technologies and techniques for a seismic survey using an augmented reality device. In one implementation, a method may include determining current location data of an augmented reality (AR) device in a physical environment. The method may also include receiving placement instructions for a first seismic survey equipment in the physical environment based on the current location data. The method may further include displaying the placement instructions in combination with a view of the physical environment on the AR device.

In another implementation, a method may include determining current location data of an augmented reality (AR) device in a physical environment. The method may also include receiving data for planned positions for seismic survey equipment in the physical environment. The method may further include generating placement instructions for the seismic survey equipment based on the current location data and the data for the planned positions. The method may additionally include displaying the placement instructions in combination with a view of the physical environment on the AR device.

In yet another implementation, a method may include determining current location data of an augmented reality (AR) device in a physical environment, receiving position data for one or more seismic survey equipment disposed in the physical environment, generating one or more retrieval data for the one or more seismic survey equipment based on the position data and the current location data, and displaying the retrieval data in combination with a view of the physical environment.

In still another implementation, a method may include displaying a view of a physical environment on an augmented reality (AR) device, where the physical environment includes seismic survey equipment disposed in the view. The method may also include receiving status data for the seismic survey equipment. The method may further include displaying the status data in combination with a view of the physical environment.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

FIGS. 1.1-1.4 illustrate simplified, schematic views of an oilfield having subterranean formation containing reservoir therein in accordance with implementations of various technologies and techniques described herein.

DETAILED DESCRIPTION

Figure 2:
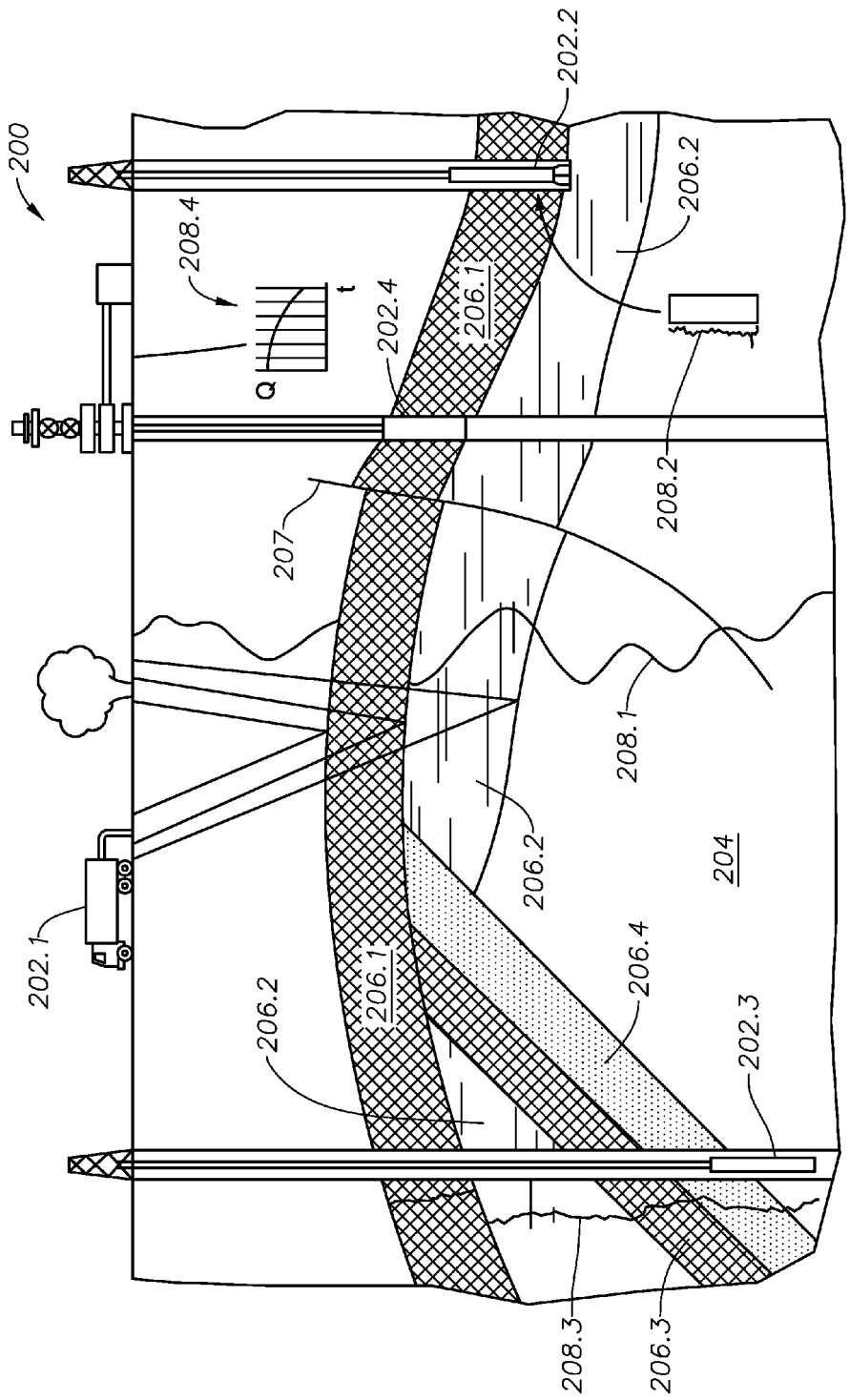
FIG. 2 illustrates a schematic view, partially in cross section of an oilfield having data acquisition tools positioned at various locations along the oilfield for collecting data of a subterranean formation in accordance with implementations of various technologies and techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for a seismic survey using an augmented reality device will now be described in more detail with reference to FIGS. 1-18 in the following paragraphs.

Production Environment & Seismic Acquisition

Seismic exploration may involve surveying subterranean geological formations for hydrocarbon deposits. A seismic survey may involve deploying seismic equipment, such as seismic source(s) and seismic sensors, at predetermined locations in one or more various configurations, as further explained below.

FIGS. 1.1-1.4 illustrate simplified, schematic views of a production field 100 having a subterranean formation 102 containing reservoir 104 therein in accordance with implementations of various technologies and techniques described herein. The production field 100 may be an oilfield, a gas field, and/or the like. FIG. 1.1 illustrates a survey operation being performed by a survey tool, such as seismic truck 106.1, to measure properties of the subterranean formation 102. The survey operation may be a seismic survey operation for producing sound vibrations. In FIG. 1.1, one such sound vibration, e.g., sound vibration 112 generated by source 110, may reflect off horizons 114 in earth formation 116. A set of sound vibrations may be received by sensors, such as geophone-receivers 118, situated on the earth's surface. The data received 120 may be provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 may be used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling mud. The drilling tools may be advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

Computer facilities may be positioned at various locations about the production field 100 (e.g., the surface unit 134) and/or at remote locations. Surface unit 134 may be used to communicate with the drilling tools and/or offsite operations, as well as with other surface or downhole sensors. Surface unit 134 may be capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about production field 100 to collect data relating to various production field operations as described previously. As shown, sensor (S) may be positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly may include capabilities for measuring, processing, and storing information, as well as communicating with surface unit 134. The bottom hole assembly may further include drill collars for performing various other measurement functions.

The bottom hole assembly may include a communication subassembly that communicates with surface unit 134. The communication subassembly may be adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It may be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the production field 100 or other locations. Surface unit 134 may also be provided with or functionally connected to one or more controllers (not shown) for actuating mechanisms at production field 100. Surface unit 134 may then send command signals to production field 100 in response to data received. Surface unit 134 may receive commands via transceiver 137 or may itself execute commands to the controller. A processor may be provided to analyze the data (locally or remotely), make the decisions and/or actuate the controller. In this manner, production field 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 may be adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about production field 100 to collect data relating to various field operations as described previously. As shown, sensor S may be positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about production field 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of a production field, such as an oilfield or gas field, it may be appreciated that the tools may be used in connection with other operations, such as mines, aquifers, storage, or other subterranean facilities. Also, while certain data acquisition tools are depicted, it may be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 may be an example of a field usable with oilfield or gas field application frameworks. At least part of the production field 100 may be on land, water, and/or sea. Also, while a single field measured at a single location may be depicted, oilfield or gas field applications may be utilized with any combination of one or more oilfields and/or gas field, one or more processing facilities and one or more wellsites.

FIG. 2 illustrates a schematic view, partially in cross section of production field 200 having data acquisition tools 202.1, 202.2, 202.3 and 202.4 positioned at various locations along production field 200 for collecting data of subterranean formation 204 in accordance with implementations of various technologies and techniques described herein. The production field 200 may be an oilfield, a gas field, and/or the like. Data acquisition tools 202.1-202.4 may be the same as data acquisition tools 106.1-106.4 of FIGS. 1.1-1.4, respectively, or others not depicted. As shown, data acquisition tools 202.1-202.4 may generate data plots or measurements 208.1-208.4, respectively. These data plots may be depicted along production field 200 to demonstrate the data generated by the various operations.

Data plots 208.1-208.3 may be examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 may be a seismic two-way response over a period of time. Static plot 208.2 may be core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 may be a logging trace that may provide a resistivity or other measurement of the formation at various depths.

A production decline curve or graph 208.4 may be a dynamic data plot of the fluid flow rate over time. The production decline curve may provide the production rate as a function of time. As the fluid flows through the wellbore, measurements may be taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 may have a plurality of geological formations 206.1-206.4. As shown, this structure may have several formations or layers, including a shale layer 206.1, a carbonate layer 206.2, a shale layer 206.3 and a sand layer 206.4. A fault 207 may extend through the shale layer 206.1 and the carbonate layer 206.2. The static data acquisition tools may be adapted to take measurements and detect characteristics of the formations.

While a specific subterranean formation with specific geological structures is depicted, it may be appreciated that production field 200 may contain a variety of geological structures and/or formations, sometimes having extreme complexity. In some locations, such as below the water line, fluid may occupy pore spaces of the formations. Each of the measurement devices may be used to measure properties of the formations and/or its geological features. While each acquisition tool may be shown as being in specific locations in production field 200, it may be appreciated that one or more types of measurement may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3:
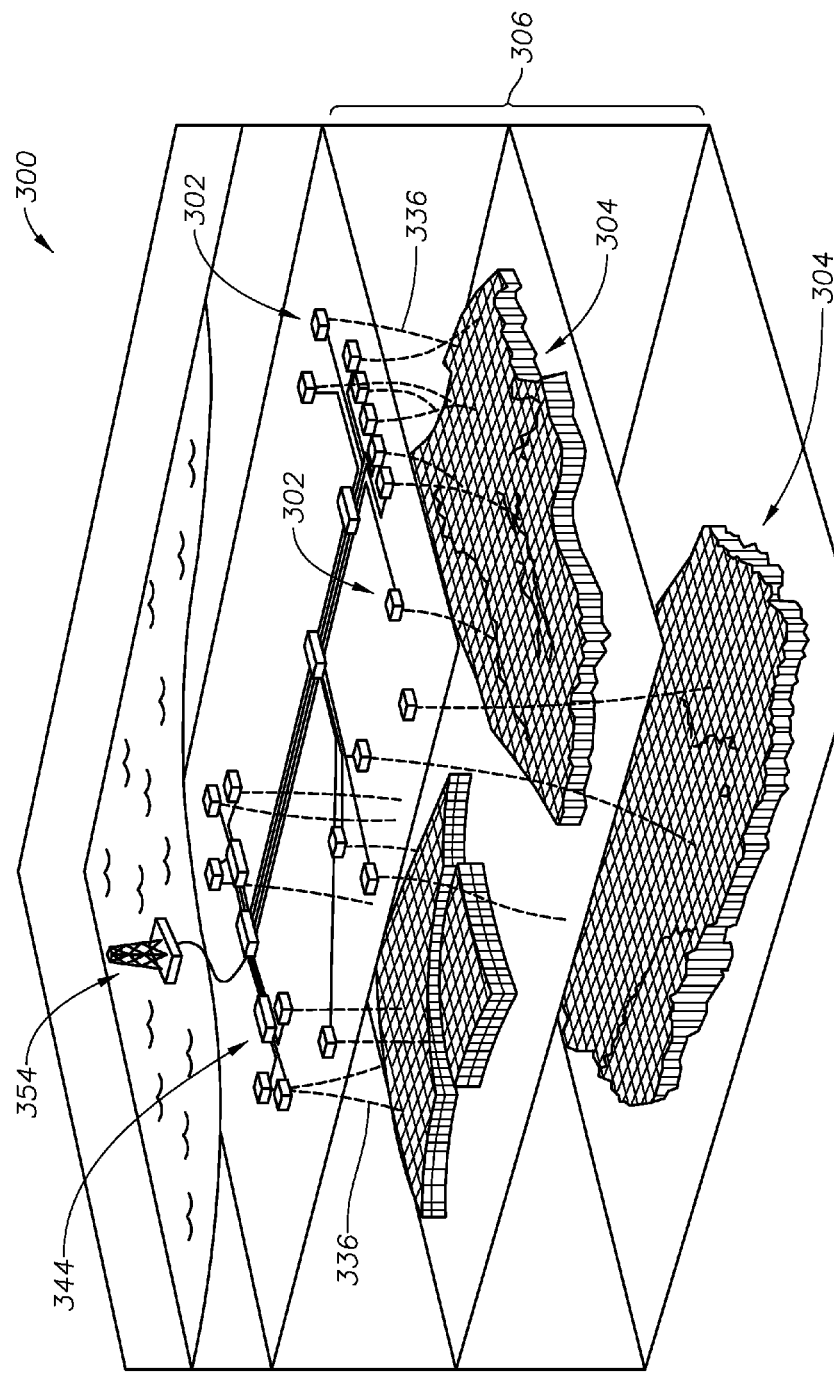
FIG. 3 illustrates an oilfield for performing production operations in accordance with implementations of various technologies and techniques described herein.

FIG. 3 illustrates a production field 300 for performing production operations in accordance with implementations of various technologies and techniques described herein. The production field 300 may be an oilfield, a gas field, and/or the like. As shown, the production field 300 may have a plurality of wellsites 302 operatively connected to central processing facility 354. The production field configuration of FIG. 3 may not be intended to limit the scope of the production field application system. At least part of the production field may be on land and/or sea. Also, while a single production field with a single processing facility and a plurality of wellsites is depicted, any combination of one or more production fields, one or more processing facilities and one or more wellsites may be present.

Each wellsite 302 may have equipment that forms wellbore 336 into the earth. The wellbores may extend through subterranean formations 306 including reservoirs 304. These reservoirs 304 may contain fluids, such as hydrocarbons. The wellsites may draw fluid from the reservoirs and pass them to the processing facilities via surface networks 344. The surface networks 344 may have tubing and control mechanisms for controlling the flow of fluids from the wellsite to processing facility 354.

Figure 4:
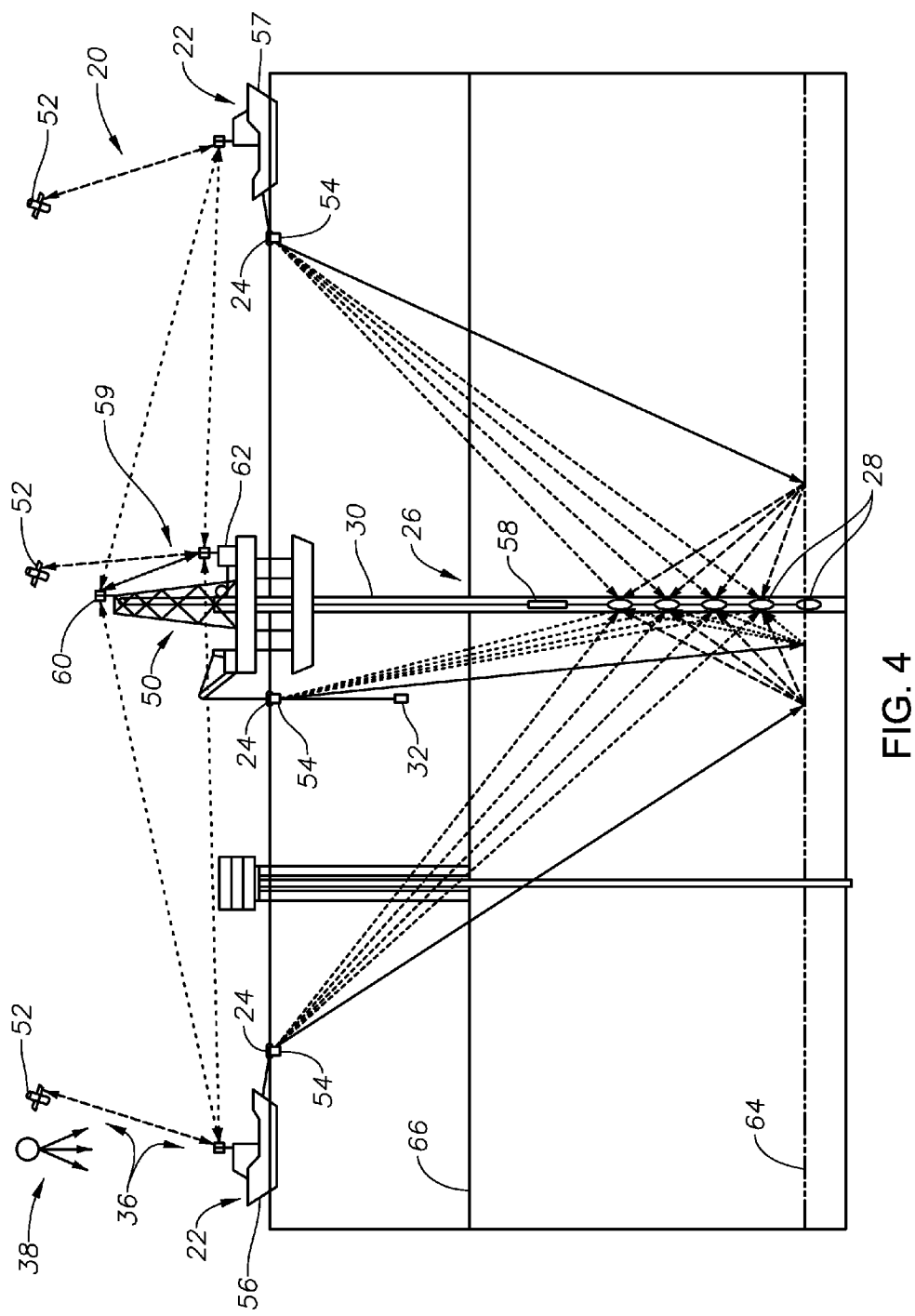
FIG. 4 illustrates a seismic system in accordance with implementations of various technologies and techniques described herein.

FIG. 4 illustrates a seismic system 20 in accordance with implementations of various technologies and techniques described herein. The seismic system 20 may include a plurality of tow vessels 22 that are employed to enable seismic profiling, e.g. three-dimensional vertical seismic profiling or rig/offset vertical seismic profiling. In FIG. 4, a marine system may include a rig 50, a plurality of vessels 22, and one or more acoustic receivers 28. Although a marine system is illustrated, other implementations of the disclosure may not be limited to this example. A person of ordinary skill in the art may recognize that land or offshore systems may be used.

Although two vessels 22 are illustrated in FIG. 4, a single vessel 22 with multiple source arrays 24 or multiple vessels 22 with single or multiple sources 24 may be used. In some implementations, at least one source and/or source array 24 may be located on the rig 50, as shown by the rig source in FIG. 4. As the vessels 22 travel on predetermined or systematic paths, their locations may be recorded through the use of navigation system 36. In some implementations, the navigation system 36 may utilize a global positioning system (GPS) 38 to record the position, speed, direction, and other parameters of the tow vessels 22.

As shown, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to a processing system or other suitable processors to predict the future movement and position of the vessels 22 based on real-time information. In addition to predicting future movements, the processing system also can be utilized to provide directions and coordinates as well as to determine initial shot times, as described above. A control system effectively utilizes the processing system in cooperation with a source controller and a synchronization unit to synchronize the sources 24 with the downhole data acquisition system 26.

As shown, the one or more vessels 22 may respectively tow one or more acoustic sources/source arrays 24. The source arrays 24 include one or more seismic signal generators 54, e.g. air guns, configured to create a seismic and/or sonic disturbance. In the implementation illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 4) or at another suitable location, and both vessels 22 may serve as slave vessels with respect to the rig source 24 or with respect to a source at another location.

However, a variety of source arrangements and implementations may be used. When utilizing dithered timing between the sources, for example, the master and slave locations of the sources can be adjusted according to the parameters of the specific seismic profiling application. In some implementations, one of the source vessels 22 (e.g. source vessel A in FIG. 4) may serve as the master source vessel while the other source vessel 22 serves as the slave source vessel with dithered firing. However, an alternate source vessel 22 (e.g. source vessel B in FIG. 4) may serve as the master source vessel while the other source vessel 22 serves as the slave source vessel with dithered firing.

Similarly, the rig source 22 may serve as the master source while one of the source vessels 22 (e.g. vessel A) serves as the slave source vessel with dithered firing. The rig source 22 also may serve as the master source while the other source vessel 22 (e.g. vessel B) serves as the slave source vessel with dithered firing. In some implementations, the rig source 22 may serve as the master source while both of the source vessels 22 serve as slave source vessels each with dithered firings. These and other implementations may be used in achieving the desired synchronization of sources 22 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, a plurality of receivers 28, as shown, may be located in a variety of positions and orientations. The acoustic receivers 28 may be configured for sonic and/or seismic reception. Additionally, the acoustic receivers 28 may be communicatively coupled with processing equipment 58 located downhole. In one implementation, processing equipment 58 may comprise a telemetry system for transmitting data from acoustic receivers 28 to additional processing equipment 59 located at the surface, e.g. on the rig 50 and/or vessels 22.

Depending on the data communication system, surface processing equipment 59 may include a radio repeater 60, an acquisition and logging unit 62, and a variety of other and/or additional signal transfer components and signal processing components. The radio repeater 60 along with other components of processing equipment 59 may be used to communicate signals, e.g. UHF and/or VHF signals, between vessels 22 and rig 50 and to enable further communication with downhole data acquisition system 26.

It should be noted the UHF and VHF signals can be used to supplement each other. The UHF band may support a higher data rate throughput, but can be susceptible to obstructions and has less range. The VHF band may be less susceptible to obstructions and may have increased radio range but its data rate throughput is lower. In FIG. 4, the VHF communications may "punch through" an obstruction in the form of a production platform.

In some implementations, the acoustic receivers 28 may be coupled to surface processing equipment 59 via a hardwired connection. In other implementations, wireless or optical connections may be employed. In still other implementations, combinations of coupling techniques may be employed to relay information received downhole via the acoustic receivers 28 to an operator and/or the control system described above, located at least in part at the surface.

In addition to providing raw or processed data uphole to the surface, the coupling system, e.g. downhole processing equipment 58 and surface processing equipment 59, may be designed to transmit data or instructions downhole to the acoustic receivers 28. For example, the surface processing equipment 59 may comprise a synchronization unit, which may coordinate the firing of sources 24, e.g. dithered (delayed) source arrays, with the acoustic receivers 28 located in borehole 30. In one implementation, the synchronization unit may use a coordinated universal time to ensure accurate timing. In some implementations, the coordinated universal time system may be employed in cooperation with global positioning system 38 to obtain UTC data from the GPS receivers of GPS system 38.

FIG. 4 illustrates one example of a system for performing seismic profiling that can employ simultaneous or near-simultaneous acquisition of seismic data. In one implementation, the seismic profiling may comprise three-dimensional vertical seismic profiling, but other applications may utilize rig and/or offset vertical seismic profiling or seismic profiling employing walkaway lines. An offset source can be provided by a source 24 located on rig 50, on a vessel 22, and/or on another vessel or structure. In one implementation, the vessels 22 may be substantially stationary.

In one implementation, the overall seismic system 20 may employ various arrangements of sources 24 on vessels 22 and/or rig 50 with each location having at least one source and/or source array 24 to generate acoustic source signals. The acoustic receivers 28 of downhole acquisition system 26 may be configured to receive the source signals, at least some of which are reflected off a reflection boundary 64 located beneath a sea bottom 66. The acoustic receivers 28 may generate data streams that are relayed uphole to a suitable processing system, e.g. the processing system described above, via downhole telemetry/processing equipment 58.

While the acoustic receivers 28 generate data streams, the navigation system 36 may determine a real-time speed, position, and direction of each vessel 22 and may estimate initial shot times accomplished via signal generators 54 of the appropriate source arrays 24. The source controller may be part of surface processing equipment 59 (located on rig 50, on vessels 22, or at other suitable locations) and may be designed to control firing of the acoustic source signals so that the timing of an additional shot time (e.g. a shot time via slave vessel 57) is based on the initial shot time (e.g. a shot time via master vessel 56) plus a dither value.

The synchronization unit of, for example, surface processing equipment 59, may coordinate the firing of dithered acoustic signals with recording of acoustic signals by the downhole acquisition system 26. The processor system may be configured to separate a data stream of the initial shot and a data stream of the additional shot via a coherency filter. As discussed above, however, other implementations may employ pure simultaneous acquisition and/or may not use separation of the data streams. In such implementations, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns may reduce the overall amount of time for three-dimensional vertical seismic profiling source acquisition. This, in turn, may significantly reduce rig time. As a result, the overall cost of the seismic operation may be reduced, rendering the data intensive process much more accessible.

If the acoustic source arrays used in the seismic data acquisition are widely separated, the difference in move-outs across the acoustic receiver array of the wave fields generated by the acoustic sources 24 can be used to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

Attention is now directed to methods, techniques, and workflows for processing and/or transforming collected data that are in accordance with some implementations. Some operations in the processing procedures, methods, techniques, and workflows disclosed herein may be combined and/or the order of some operations may be changed. In the geosciences and/or other multi-dimensional data processing disciplines, various interpretations, sets of assumptions, and/or domain models such as velocity models, may be refined in an iterative fashion; this concept may be applicable to the procedures, methods, techniques, and workflows as discussed herein. This iterative refinement can include use of feedback loops executed on an algorithmic basis, such as via a computing system, as discussed later, and/or through manual control by a user who may make determinations regarding whether a given action, template, or model has become accurate.

Figure 5:
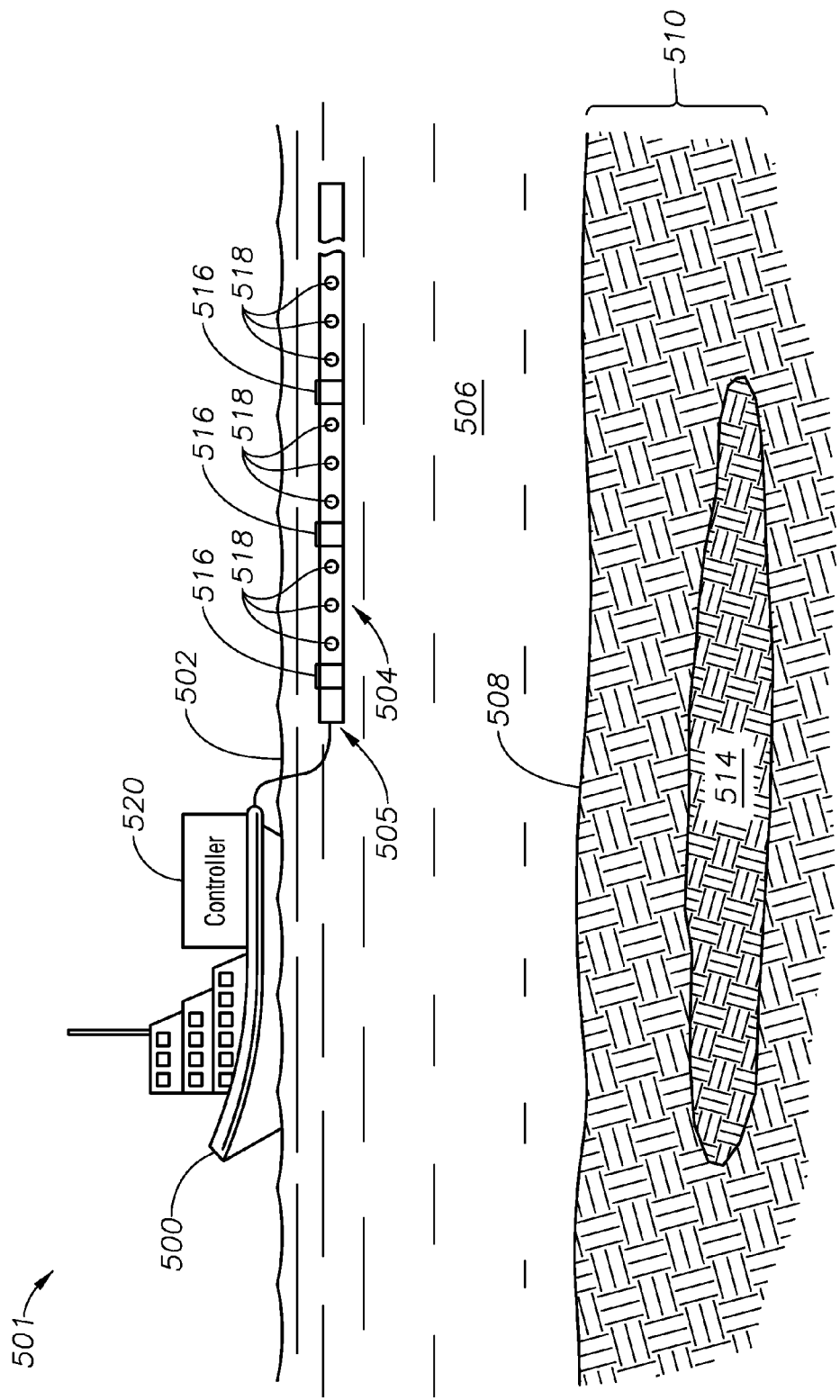
FIG. 5 illustrates a schematic diagram of a marine-based seismic acquisition system for use in a seismic survey in accordance with implementations of various techniques described herein.

FIG. 5 illustrates a schematic diagram of a marine-based seismic acquisition system 501 for use in a seismic survey in accordance with implementations of various techniques described herein. In system 501, survey vessel 500 tows one or more seismic streamers 505 (one streamer 505 being depicted in FIG. 5) behind the vessel 500. In one implementation, streamers 505 may be arranged in a spread 504 in which multiple streamers 505 are towed in approximately the same plane at the same depth. Although various techniques are described herein with reference to a marine-based seismic acquisition system shown in FIG. 5, it should be understood that other marine-based seismic acquisition system configurations may also be used. For instance, the streamers 505 may be towed at multiple planes and/or multiple depths, such as in an over/under configuration. In one implementation, the streamers 505 may be towed in a slanted configuration, where fronts of the streamers are towed shallower than tail ends of the streamers.

Seismic streamers 505 may be several thousand meters long and may contain various support cables, as well as wiring and/or circuitry that may be used to facilitate communication along the streamers 505. In general, each streamer 505 may include a primary cable where seismic receivers that record seismic signals may be mounted. In one implementation, seismic receivers may include hydrophones that acquire pressure data. In another implementation, seismic receivers may include multi-component sensors such that each sensor is capable of detecting a pressure wavefield and at least one component of a particle motion that is associated with acoustic signals that are proximate to the sensor. Examples of particle motions include one or more components of a particle displacement, one or more components (i.e., inline (x), crossline (y) and vertical (z) components) of a particle velocity and one or more components of a particle acceleration.

Depending on the particular survey need, the multi-component seismic receiver may include one or more hydrophones, geophones, particle displacement sensors, particle velocity sensors, accelerometers, pressure gradient sensors, or combinations thereof. In one implementation, the multi-component seismic receiver may be implemented as a single device or may be implemented as a plurality of devices.

Marine-based seismic data acquisition system 501 may also include one or more seismic sources, such as air guns and the like. In one implementation, seismic sources may be coupled to, or towed by, the survey vessel 500. In another implementation, seismic sources may operate independently of the survey vessel 500 in that the sources may be coupled to other vessels or buoys.

As seismic streamers 505 are towed behind the survey vessel 500, acoustic signals, often referred to as "shots," may be produced by the seismic sources and are directed down through a water column 506 into strata 510 beneath a water bottom surface 508. Acoustic signals may be reflected from the various subterranean geological formations, such as formation 514 depicted in FIG. 5. The incident acoustic signals that are generated by the sources may produce corresponding reflected acoustic signals, or pressure waves, which may be sensed by seismic sensors of the seismic streamers 505.

The seismic sensors may generate signals, called "traces," which indicate the acquired measurements of the pressure wavefield and particle motion. The traces (i.e., seismic data) may be recorded and may be processed by a signal processing unit or a controller 520 deployed on the survey vessel 500.

The goal of the seismic acquisition may be to build up an image of a survey area for purposes of identifying subterranean geological formations, such as the geological formation 514. Subsequent analysis of the image may reveal probable locations of hydrocarbon deposits in subterranean geological formations. In one implementation, portions of the analysis of the image may be performed on the seismic survey vessel 500, such as by the controller 520.

A particular seismic source may be part of an array of seismic source elements (such as air guns, for example) that may be arranged in strings (gun strings, for example) of the array. Regardless of the particular composition of the seismic sources, the sources may be fired in a particular time sequence during the survey. Although FIG. 5 illustrates a marine-based seismic acquisition system, the marine-based seismic acquisition system is merely provided as an example of a seismic acquisition system that may be used with the methods described herein. It should be noted that the methods described herein may also be performed on a seabed-based seismic acquisition system, or a transition zone-based seismic acquisition system.

In addition to the seismic sources and receivers, an acoustic positioning system may be used to determine the positions of seismic acquisition equipment used in the seismic acquisition system 501, such as the seismic streamers 505 and the seismic receivers disposed thereon. The acoustic positioning system may include one or more acoustic positioning sources 516 and one or more acoustic positioning receivers 518. In one implementation, the acoustic positioning sources 516 and the acoustic positioning receivers 518 may be disposed along the one or more seismic streamers 505. In such an implementation, and as described further below, power and/or control electronics may be incorporated into the one or more seismic streamers 505 as well. In a further implementation, the acoustic positioning system may be a stand-alone system with separate power supply and communication telemetry links to the survey vessel 500.

In one implementation, the acoustic positioning receivers 518 may be the same as the seismic receivers described above or some subset of the seismic receivers. The acoustic positioning sources 516 may be higher frequency acoustic sources, as opposed to the seismic sources described above that may be used for performing a seismic survey operation and may be of a lower frequency. The acoustic positioning sources 516 may include an acoustic transmitter or any other implementation known to those skilled in the art. In some implementations, the acoustic positioning source 516 and the acoustic positioning receiver may be combined into a single physical unit. In some implementations, an acoustic positioning source 516 and an acoustic positioning receiver 518 may be combined into one transducer unit. In such an implementation, the transducer unit may act as an acoustic positioning source 516, an acoustic positioning acoustic positioning receiver 518, or both.

The controller 520 may be configured to control activation of the acoustic positioning sources 516 of the acoustic positioning system. In particular, and as further discussed below with respect to the operation of the acoustic positioning system, the acoustic positioning sources 516 may produce one or more acoustic positioning signals that may be recorded by the acoustic positioning receivers 518. In one implementation, an acoustic positioning receiver 518 may detect acoustic positioning signals from an acoustic positioning source 516 located within the same seismic streamer 505 as the acoustic positioning receiver 518. In another implementation, an acoustic positioning receiver 518 may detect acoustic positioning signals from an acoustic positioning source 516 located within a different seismic streamer 505 as the acoustic positioning receiver 518.

As also discussed below with respect to the operation of the acoustic positioning system, the controller 520 may be configured to process the acoustic positioning signals collected by the acoustic positioning receivers 518. In particular, processing an acquired acoustic positioning signal may yield the travel time of the signal between an acoustic positioning source 516 and an acoustic positioning receiver 518. In turn, the travel time may be used to derive the travel distance of the acoustic positioning signal between the acoustic positioning source 516 and the acoustic positioning receiver 518. This travel distance can then be used to calculate the relative positions of the acoustic positioning source 516 and/or the acoustic positioning receiver 518 in the seismic streamer 505. A distance between relative positions of an acoustic positioning source 516 and an acoustic positioning receiver 518 may be referred to as a range.

In one implementation, the controller 520 may process the relative positions and other information to produce (or update) a positioning model to enable estimation of positioning of the seismic acquisition equipment (e.g., position of a seismic streamer 505, depth of a seismic streamer 505, distances between seismic receivers, etc.).

Figure 6:
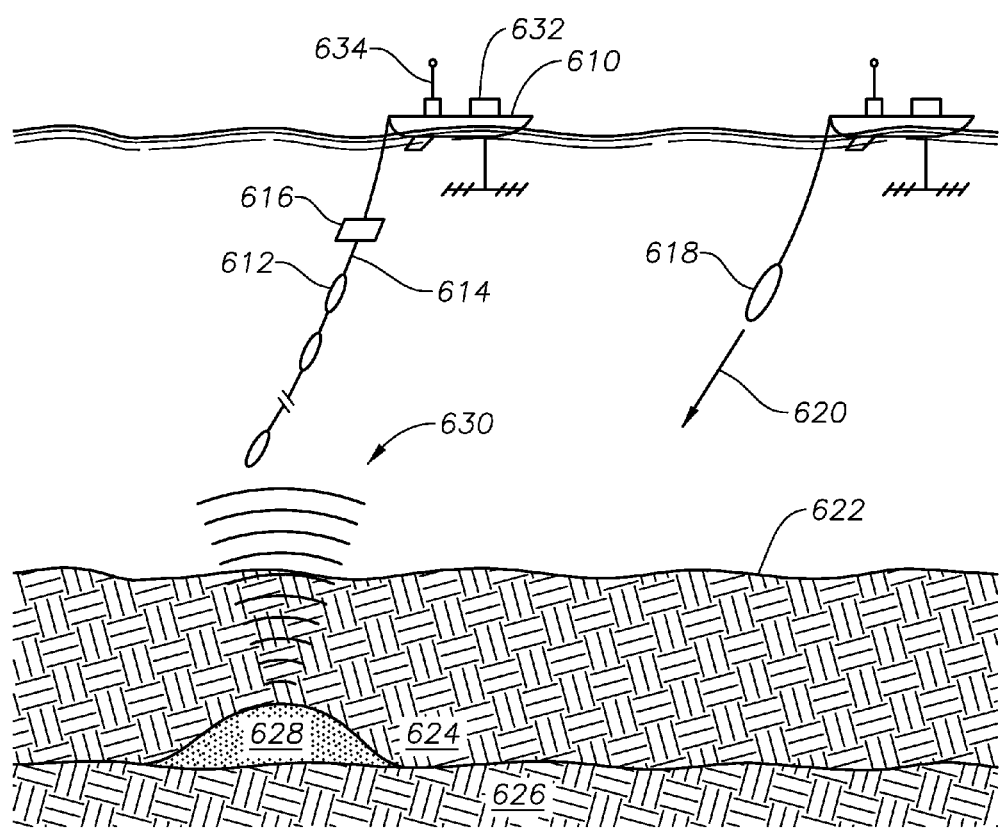
FIG. 6 illustrates a schematic diagram of a marine-based seismic acquisition system in accordance with implementations of various techniques described herein.

FIG. 6 illustrates a schematic diagram of a marine-based seismic acquisition system 600 in accordance with implementations of various techniques described herein. The system 600 may include one or more water vehicles 610, which may be adapted to descend through a water column or may be adapted for movement on a sea surface via a thrust or propulsion mechanism. In one implementation, the water vehicle 610 may be unmanned. For example, the unmanned water vehicle 610 may take the form of an autonomously operating vehicle (AOV) or a remotely operating vehicle (ROV) maneuvering on the sea surface, such as a wave glider or a hybrid water vehicle. The wave glider may be configured to harness wave energy to impart motion to the wave glider, such as the wave glider described in U.S. Pat. No. 7,371,136 entitled WAVE POWER, which is incorporated herein by reference. The hybrid water vehicle may be configured to combine mechanical propulsion methods with energy harvesting principles, such as the energy harvesting principles used by wave gliders. In other implementations, the water vehicle 610 may take the form of a diving wave glider, a submarine water vehicle, a sail buoy, or any other implementation known to those skilled in the art.

The water vehicle 610 may be used for seismic surveying and may include one or more sensors 612. The sensors 612 may be disposed on one or more streamers 614 coupled to the water vehicle 610, where the streamer 614 may descend in a generally vertical direction from the water vehicle 610 into the water column. In one implementation, the streamer 614 may descend 615 meters below the sea surface.

The seismic sensors 612 may be pressure sensors, particle motion sensors, or multi-component seismic sensors. For the case of multi-component seismic sensors, the seismic sensors 612 are capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components) of a particle velocity and one or more components of a particle acceleration.

Multi-component seismic sensors may include one or more geophones, hydrophones, particle displacement sensors, optical sensors, particle velocity sensors, accelerometers, pressure gradient sensors, or combinations thereof. For example, a particular multi-component seismic sensor may include three orthogonally-aligned accelerometers (e.g., a three-component micro electro-mechanical system (MEMS) accelerometer) to measure three corresponding orthogonal components of particle velocity and/or acceleration near the seismic sensor. In such implementations, the MEMS-based sensor may be a capacitive MEMS-based sensor of the type described in commonly assigned co-pending U.S. patent application Ser. No. 12/268,064, which is incorporated herein by reference. In some implementations, a hydrophone for measuring pressure may also be used with the three-component MEMS described herein.

The multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The water vehicle 610 may be deployed to a survey area for seismic surveying. Where the water vehicle 610 takes the form of an AOV, the water vehicle 610 may be deployed to a survey area specified on a navigation map, and the water vehicle 610 may automatically make corrections if the water vehicle 610 veers off-course. Where the water vehicle 610 takes the form of a ROV, the water vehicle 610 may be deployed to a survey area using remote operation of the water vehicle's rudder.

After deploying the water vehicle 610 to the survey area, a seismic source 618 may be detonated to generate acoustic waves 620 that propagate through an ocean bottom surface 622 and into strata 624, 626 beneath the ocean bottom surface. The seismic source 618 may be located on another water vehicle 610, as shown in FIG. 6, or more conventional source deployments may be used, such as the use of dedicated source vessels. The seismic source 618 may be a conventional air gun, marine vibrator, or non-traditional environmentally friendly source. The seismic source may also include drilling induced acoustic pressure waves, passive seismic noise, or production induced acoustic pressure waves, such as those which may result from water or gas injections, or combinations thereof.

The acoustic signals 620 may be reflected from various subterranean geological formations, such as formation 628 depicted in FIG. 6. The incident acoustic signals 620 produce corresponding reflected acoustic signals, or pressure waves 630, which are sensed by the seismic sensors 612. In one implementation, the water vehicle 610 may record seismic data from over one hundred seismic sensors.

The seismic sensors 612 generate signals called "traces," which indicate the acquired measurements of the pressure wavefield and particle motion if the sensors include particle motion sensors. The traces are recorded and may be passed to a data acquisition system 632 disposed on the water vehicle 610. The data acquisition system 632 may include a digitizer, a computer system, and a storage system for storing seismic data acquired during the survey. The storage system may include memory, such as in the form of a hard disk drive. In one implementation, the seismic data may be recorded continuously over days or months at a time. In another implementation, the seismic data may be recorded intermittently, such as after each detonation of the seismic source 618.

The water vehicle 610 may further include an onboard communication unit 634, which may communicate with a base station located onshore or at sea, such as on a rig or vessel. The communication unit 634 may be used to transmit water vehicle position, quality control parameters, time information, and seismic data. The communication unit 634 may also send or receive commands particular to the seismic survey. The water vehicle 610 may also be powered by batteries, which may be recharged by solar panels disposed on the top of the water vehicle 610.

Using Augmented Reality Device

As noted above, in conducting a seismic survey, one or more types of survey equipment may be used. For example, in land environments, seismic sources and seismic sensors, such as sources 110 and geophone-receivers 118 of FIG. 1.1, may be employed during a seismic survey. Similarly, in marine environments, survey equipment such as the seismic streamers 505 of FIG. 5 and/or water vehicles 610 of FIG. 6 may be employed during a seismic survey. In addition, one or more augmented reality (AR) devices may be used to facilitate the placement, recovery, and/or monitoring of the survey equipment.

AR Device

An AR device may be a device configured to present an augmented reality to a user. In particular, the augmented reality presented to the user may be a view of a physical environment, where elements of the physical environment may be supplemented by computer-generated sensory input such as sound, video, graphics, and/or other data. Types of AR devices may include eyeglass devices, tablet computers, mobile phones, drone camera devices, helmet devices, goggle devices, and/or any other implementations known to those skilled in the art.

In one implementation, one or more AR devices may be used to present a view of a physical environment having at least a portion of a seismic survey operation disposed therein to a user. One or more survey equipment used in the seismic survey may be disposed in this physical environment, and thus may also be displayed in the view. In such an implementation, the view of the physical environment may be supplemented with information relating to the survey equipment in the form of computer-generated graphics and/or other imagery. In another implementation, the physical environment viewed by the user may be located proximate to the AR device, such as in front of the AR device. In yet another implementation, the view of the physical environment may be supplemented with information relating to the physical environment itself.

Display

The AR device may include a display which may be used to present the view of the physical environment (including the survey equipment disposed therein) and the information relating to the survey equipment. In one implementation, the display may be substantially transparent. In such an implementation, the user may see a live view of the physical environment by looking through the substantially transparent display. In addition, the information relating to the survey equipment may be displayed on, in, and/or through the substantially transparent display, such that the information may appear to the user as a graphic and/or image being superimposed on the view of the live, physical environment. For example, the AR device may be an eyeglass device having substantially transparent lenses, where the lenses are also configured to display computer-generated graphics and/or imagery to a user, as further explained below.

In another implementation, the display of the AR device may be in the form of a monitor. In particular, the monitor may show the view of the physical environment and the information relating to the survey equipment, where the view and the information may be generated by the AR device. In such an implementation, the view of the physical environment and the information relating to the survey equipment may be shown on the monitor in real time, near-real time, or delayed time. For example, the view of the physical environment shown on the monitor may be in the form of a video of the physical environment, as taken by a camera coupled to the AR device. In another example, the view of the physical environment shown on the monitor may be in the form of a virtual reality simulation of the physical environment. In such an example, the virtual reality simulation may correspond to the actual physical environment surrounding the AR device, and the images presented by the simulation may move in conjunction with movement of the AR device. Such an AR device may be used at night, when visibility of the physical environment may be low.

Other Components

As noted above, the AR device may include a camera coupled thereto, where the camera may be used to record video of the physical environment. In one implementation, the camera may be attached directly to the AR device, such that the camera may record video of the physical environment proximate to the AR device. In another implementation, the camera may be located remotely from other components of the AR device, and may merely be communicably coupled to said components, including the display. In one such implementation, the camera may record video of a physical environment located at a distance from other components of the AR device, and may transmit the video to the AR device for display on a monitor of the AR device.

The AR device may also include a computing system, as further described below with respect to FIG. 19. In particular, the computing system may include one or more processing units and one or more forms of computer storage media, such as a hard disk drive. The AR device may also be configured to connect with a network and/or other devices using wired and/or wireless connections. In one implementation, the AR device may generate the view of the physical environment and/or the information relating to the survey equipment based on data from its own storage media, based on data received via the network and/or other devices, or combinations thereof.

The AR device may also include a navigation system that may utilize a global navigation satellite system (GNSS), such as a global positioning system (GPS), to record the position, speed, direction, and other parameters of the AR device. The GNSS may operate similarly to the global positioning system 38 as described above with respect to FIG. 4. In one implementation, the navigation system may include a GPS unit configured to interact with the GPS. Though the applications below are described as using GPS, other forms of GNSS may be used instead or in addition to the GPS.

EXAMPLES

Various configurations for an AR device, as known to those skilled in the art, may be used in connection with a seismic survey, including, but not limited to, the following implementations.

Figure 7:
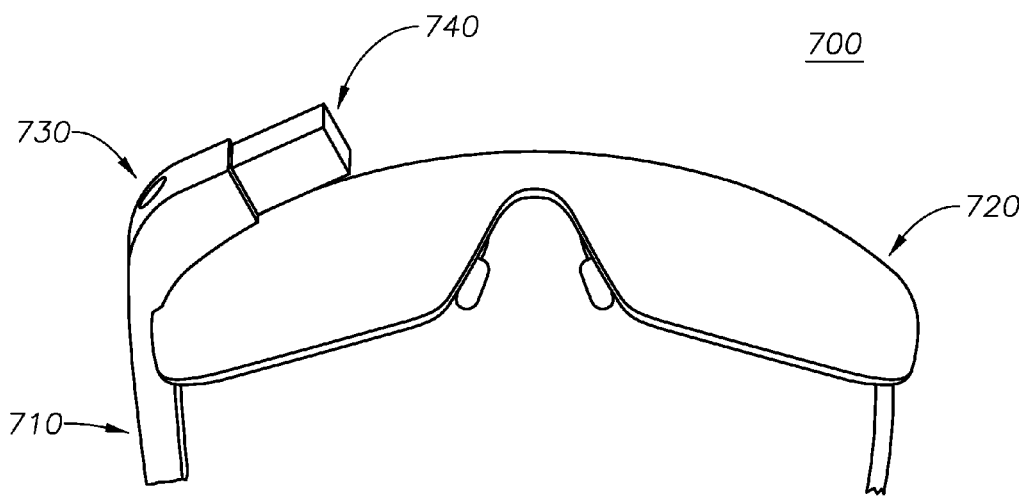
FIG. 7 illustrates an eyeglass device in accordance with implementations of various techniques described herein.

In one implementation, the AR device may be in the form of wearable electronics. As noted above, in one such implementation, the AR device may take the form of an eyeglass device having substantially transparent lenses, where the lenses may also be configured to display computer-generated graphics and/or imagery to a user. FIG. 7 illustrates an eyeglass device 700 in accordance with implementations of various techniques described herein. The eyeglass device 700 may include lenses 720, camera 730, computing system (not pictured), and an imaging unit 740 disposed on frame 710. In particular, the lenses 720 may be substantially transparent, such that the user wearing the frame 710 may see a live view of the physical environment by looking through the lenses 720. The camera 730 may be used to capture data about the physical environment in front of the user, including the survey equipment disposed in the environment. The imaging unit 740 may be disposed on the outside of the lenses 720, and may display information relating to survey equipment through the lenses 720, such that the information may appear to the user as a graphic and/or image being superimposed on the view of the live, physical environment.

In another implementation, the AR device may include a heads-up display, such as on a windshield of a vehicle. In such an implementation, the AR device may include a computing system and an imaging system. While a user may see a live view of the physical environment by looking through the windshield, the imaging system may be configured to display the information relating to survey equipment on the windshield, such that the information may appear to the user as a graphic and/or image being superimposed on the view of the live, physical environment.

In another implementation, the AR device may be a tablet computer having a camera attached to a back panel of the tablet computer, and where the tablet computer includes a monitor in the form of a touch screen. In such an implementation, the touch screen may display the view of the physical environment, where the view of the physical environment may be in the form of video captured by the camera. The touch screen may also display information relating to survey equipment, where the information may be based on data from the tablet computer's own storage media, based on data received via a network and/or other devices, or combinations thereof.

In yet another implementation, the AR device may include a monitor located remotely from a camera, as discussed above. In one such implementation, the camera may be coupled to a drone device. The drone device may be configured to operate in land and/or marine environments. As similarly noted above, the camera coupled to the drone device may record video of a physical environment being traversed by the drone device, and may transmit the video to other components of the AR device for display on its monitor. The AR device may generate and display information relating to survey equipment based on data from its own storage media, based on data received via a network and/or other devices, or combinations thereof.

Applications

In conducting a seismic survey, one or more AR devices may be used for various applications, including, but not limited to, the following implementations.

Sensor Placement

As noted above, in land environments, seismic sensors may be used when conducting a seismic survey. In one implementation, one or more AR devices may be used to place the seismic sensors at planned positions in a physical environment to be surveyed. In one implementation, the seismic sensors may be placed in an irregular pattern in the environment based on the planned positions. Seismic sensors may include geophones and/or the like, as discussed above with respect to FIG. 1.1.

Figure 8:
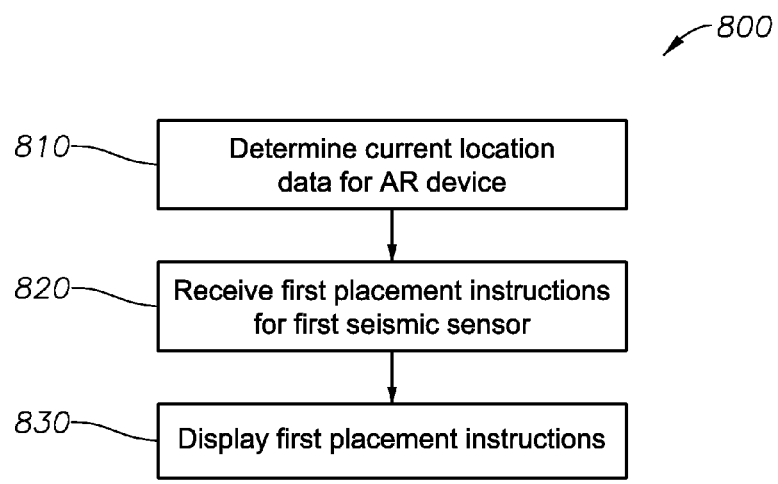
FIG. 8 illustrates a flow diagram of a method for placing one or more seismic sensors in a physical environment using an augmented reality (AR) device in accordance with implementations of various techniques described herein.

FIG. 8 illustrates a flow diagram of a method 800 for placing one or more seismic sensors in the physical environment using an AR device in accordance with implementations of various techniques described herein. In one implementation, method 800 may be performed by the AR device. It should be understood that while method 800 indicates a particular order of execution of operations, in some implementations, certain portions of the operations might be executed in a different order. Further, in some implementations, additional operations or blocks may be added to the method. Likewise, some operations or blocks may be omitted.

At block 810, current location data for the AR device may be determined. The current location data may include a GPS location of the AR device, geographic coordinates of the AR device, and/or the like. The GPS location may be determined using the GPS unit of the AR device. In one implementation, the AR device may continuously determine its current location data.

In another implementation, the current location data may be transmitted to a central computer using a wired or wireless connection. The central computer may be a computing system positioned at a location away from the AR device. In one implementation, the central computer may be located in the physical environment. In such an implementation, the AR device may continuously transmit its current location data to the central computer.

At block 820, one or more first placement instructions for a first seismic sensor may be received. In one implementation, the first placement instructions may include navigational instructions for reaching a planned position for the first seismic sensor. The first placement instructions may be received from the central computer, which may generate the instructions based on the current location data received from the AR device. The navigational instructions may include directions for reaching the planned position efficiently, such as by avoiding hazards. In another implementation, the first placement instructions may include a GPS location of the planned position, geographic coordinates of the planned position, instructions for orientation of the first seismic sensor, and/or the like.

In one implementation, the AR device may receive updated first placement instructions based on changes to the current location data sent to the central computer. For example, if the AR device were to traverse off course, then the first placement instructions may be updated to provide new navigational instructions.

At block 830, the one or more first placement instructions may be displayed. In particular, the first placement instructions may be displayed on a display of the AR device. In one implementation, the user may view the physical environment in which the seismic sensors are to be placed using the display of the AR. The AR device may supplement this view with the first placement instructions, which may take the form of computer-generated graphics and/or other imagery also displayed by the AR.

For example, the display of the AR device may show turn by turn instructions for reaching the planned position superimposed on the view of the physical environment. In another example, the display of the AR device may show a graphical marker superimposed on the view of the physical environment, where the graphical marker may represent the location of the planned position. In such an example, the size of the graphical marker displayed to the user may decrease as the AR device approaches the planned position. In yet another implementation, the display of the AR device may show arrows, lines, and/or the like for guidance to the planned position.

Upon placing the first seismic sensor at or near its planned position, the AR device may transmit an updated current location data, receive second placement instructions for placing a second seismic sensor at its planned position, and subsequently display the second placement instructions, as similarly described above. The method 800 may be repeated for respective seismic sensors until a sufficient number have been placed at their planned positions. In another implementation, upon placing the seismic sensor at or near the planned position, the GPS location of the sensor may be transmitted to the seismic sensor for storage therein.

In yet another implementation, the AR device itself may generate the placement instructions for the seismic sensors. In particular, the AR device may receive and then store the one or more planned positions for the seismic sensors, such as from the central computer. The one or more planned positions may include GPS coordinates, geographic coordinates, and/or the like for the planned positions. Subsequently, the AR device may generate the placement instructions for the sensors based on its current location data and the stored planned positions, and then display the placement instructions.

Sensor Retrieval

In one implementation, in land environments, one or more AR devices may be used to retrieve one or more seismic sensors disposed in a physical environment containing at least a part of a seismic survey. In such an implementation, the seismic sensors may be retrieved due to malfunction, replacement, repairs, routine inspection, and/or the like. In a further implementation, the seismic sensors may be substantially covered or may be obstructed from view by conditions of the physical environment. For example, over time, the seismic sensors may become covered over by sand, snow, vegetation, and/or the like. Seismic sensors may include geophones and/or the like, as discussed above with respect to FIG. 1.1.

Figure 9:
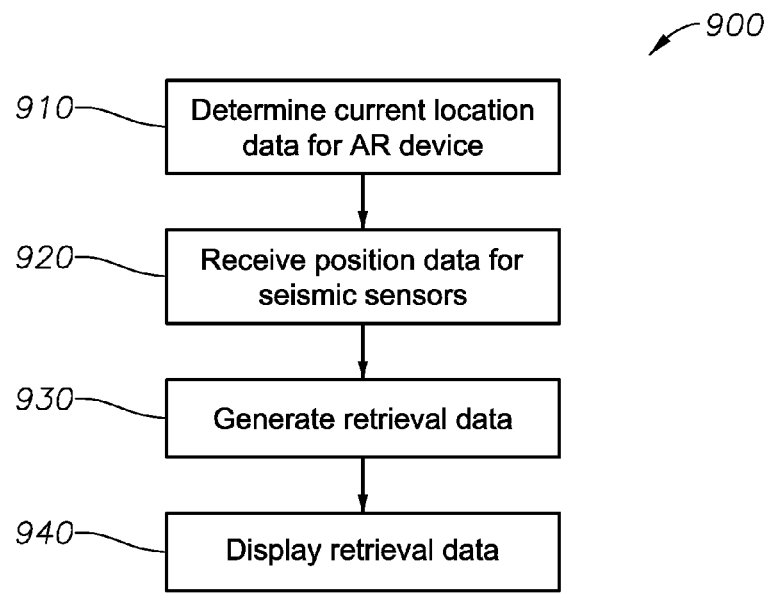
FIG. 9 illustrates a flow diagram of a method for retrieving one or more seismic sensors in a physical environment using an AR device in accordance with implementations of various techniques described herein.

FIG. 9 illustrates a flow diagram of a method 900 for retrieving one or more seismic sensors in the physical environment using an AR device in accordance with implementations of various techniques described herein. In one implementation, method 900 may be performed by the AR device. It should be understood that while method 900 indicates a particular order of execution of operations, in some implementations, certain portions of the operations might be executed in a different order. Further, in some implementations, additional operations or blocks may be added to the method. Likewise, some operations or blocks may be omitted.

At block 910, current location data for the AR device may be determined. The current location data may include a GPS location of the AR device, geographic coordinates of the AR device, and/or the like. The GPS location may be determined using the GPS unit of the AR device. In one implementation, the AR device may continuously determine its current location data.

At block 920, position data for one or more seismic sensors may be received. In one implementation, the position data may include one or more GPS locations of the seismic sensors, one or more geographic coordinates of the seismic sensors, and/or the like.

In one implementation, the AR device may receive position data directly from each seismic sensor. In such an implementation, each seismic sensor in the physical environment may continuously broadcast its position data using a wireless connection, such as via Wi-Fi™ technology, cellular technology, Bluetooth™ technology, satellite technology, radio frequency (RF) technology, or any other implementation known to those skilled in the art. The AR device may detect the broadcasts within a specified wireless range of the AR device. In one implementation, the AR device may then establish wireless connections with one or more of the detected sensors based on certain criteria. Such criteria may include those detected seismic sensors being within the view of the physical environment displayed by the AR device and/or having the strongest wireless connection. Upon establishing the wireless connections with one or more of the detected sensors, the AR device may then receive the position data for the one or more of the detected sensors.

In another implementation, the AR device may receive the position data for one or more seismic sensors from the central computer. In yet another implementation, the AR device may retrieve the position data for one or more seismic sensors from the storage media of the AR device.

At block 930, one or more retrieval data for the one or more seismic sensors may be generated. The retrieval data may include distances to each of the seismic sensors, navigational instructions to each of the seismic sensors, and/or the like. The retrieval data may be generated based on the position data of the seismic sensors and the current location data for the AR device.

At block 940, the one or more retrieval data may be displayed. In particular, the retrieval data may be displayed on the display of the AR device. In one implementation, the user may view the physical environment containing the one or more seismic sensors using the display of the AR. The AR device may supplement this view with the retrieval data, which may take the form of computer-generated graphics and/or other imagery also displayed by the AR. Such displayed retrieval data may assist a user with retrieving the seismic sensors from the physical environment.

For example, the display of the AR device may show turn by turn instructions for reaching a seismic sensor superimposed on the view of the physical environment. In another example, the display of the AR device may show one or more graphical markers superimposed on the view of the physical environment, where the graphical markers may represent the locations of the one or more seismic sensors.

Figure 10:
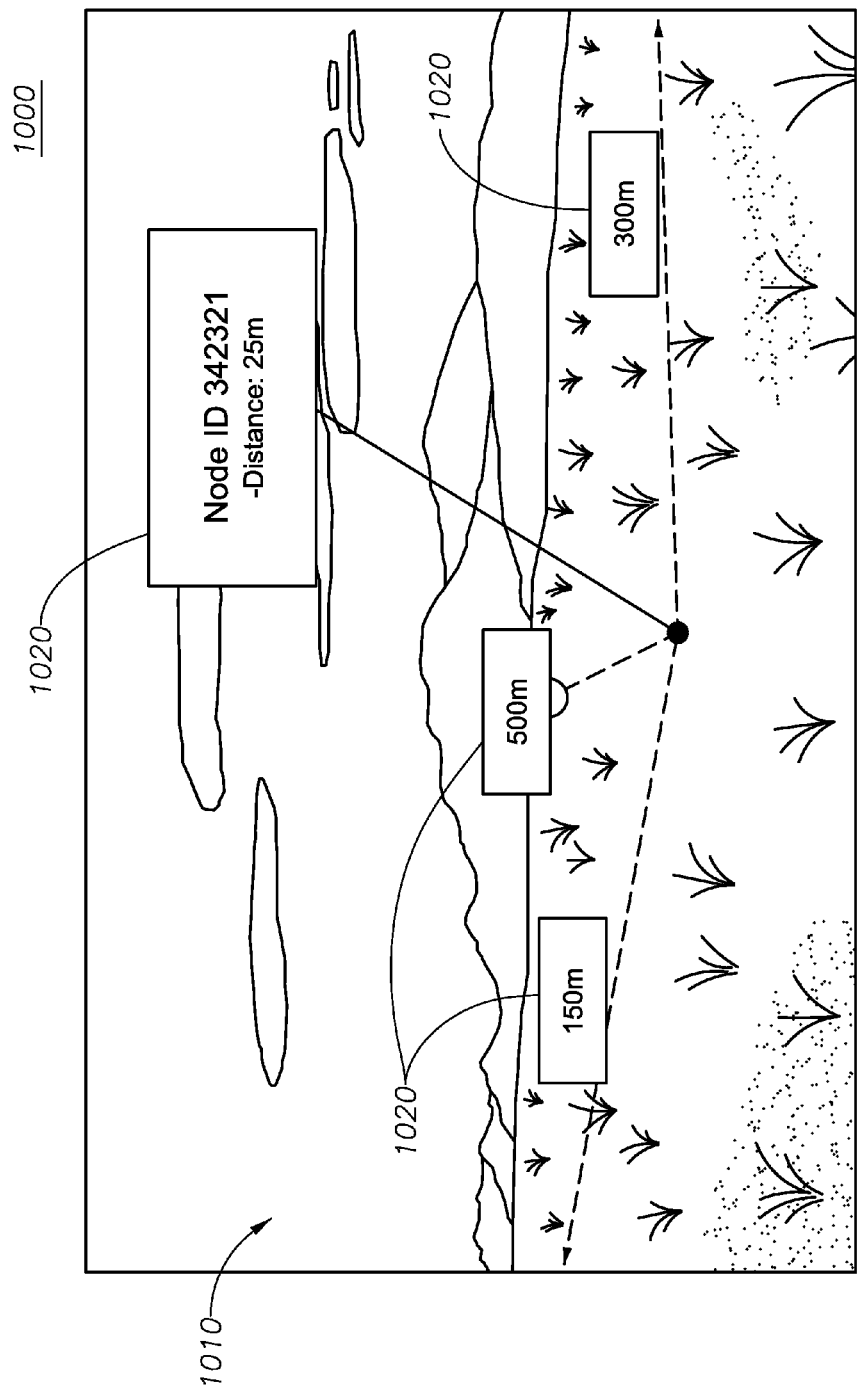
FIG. 10 illustrates a schematic of a display of an AR device in accordance with implementations of various techniques described herein.

FIG. 10 illustrates a schematic of a display 1000 of an AR device in accordance with implementations of various techniques described herein. Display 1000 of the AR device shows a view of a physical environment 1010 supplemented with various retrieval data 1020. Such retrieval data 1020 may include sensor identification numbers, distance numbers from the AR device, directional arrows to other seismic sensors, and/or the like.

In one implementation, the method 900 may be repeated for remaining seismic sensors until a sufficient number have been retrieved. In another implementation, the method 900 may be similarly used to retrieve seismic sources disposed in the physical environment.

Sensor Status

In one implementation, in land environments, the AR device may be used to determine status data of one or more seismic sensors disposed in a physical environment containing at least a part of a seismic survey. In such an implementation, the status data of the one or more sensors may include diagnostics, health status, repairs needed, power status, data on repairs and/or maintenance to be performed, repair and/or maintenance instructions, distress codes, orientation data, and/or the like. Seismic sensors may include geophones and/or the like, as discussed above with respect to FIG. 1.1.

Figure 11:
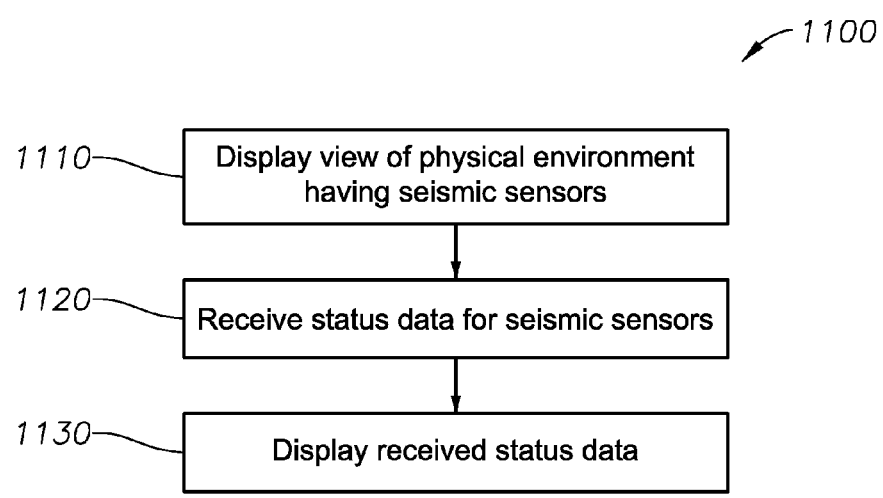
FIG. 11 illustrates a flow diagram of a method for obtaining status data for one or more seismic sensors in a physical environment using an AR device in accordance with implementations of various techniques described herein.

FIG. 11 illustrates a flow diagram of a method 1100 for obtaining status data for one or more seismic sensors in the physical environment using an AR device in accordance with implementations of various techniques described herein. In one implementation, method 1100 may be performed by the AR device. It should be understood that while method 1100 indicates a particular order of execution of operations, in some implementations, certain portions of the operations might be executed in a different order. Further, in some implementations, additional operations or blocks may be added to the method. Likewise, some operations or blocks may be omitted.

At block 1110, the AR device may display a view of the physical environment having one or more seismic sensors disposed therein. In one implementation, the AR device may supplement this view with the retrieval data for each of the seismic sensors, as discussed above with respect to FIG. 9.

At block 1120, the AR device may receive status data for the one or more seismic sensors. In one implementation, each seismic sensor may continuously broadcast its status data using a wireless connection, such as via Wi-Fi™ technology, cellular technology, Bluetooth™ technology, satellite technology, (RF) technology, or any other implementation known to those skilled in the art. The AR device may detect the broadcasts within a specified wireless range of the AR device. In one implementation, the AR device may then establish a wireless connection with one or more particular seismic sensors of the detected sensors based on certain criteria. Such criteria may include the seismic sensor being within the view of the physical environment displayed by the AR device. Upon establishing the wireless connection, the AR device may receive the status data from each wirelessly connected seismic sensor. In yet another implementation, the AR device may receive the status data from the central computer.

At block 1130, the AR device may display the received status data. In one implementation, the AR device may supplement the view of the physical environment with the received status data, which may take the form of computer-generated graphics and/or other imagery also displayed by the AR. In one implementation, the received status data could be used for troubleshooting the one or more seismic sensors disposed in the physical environment.

Figure 12:
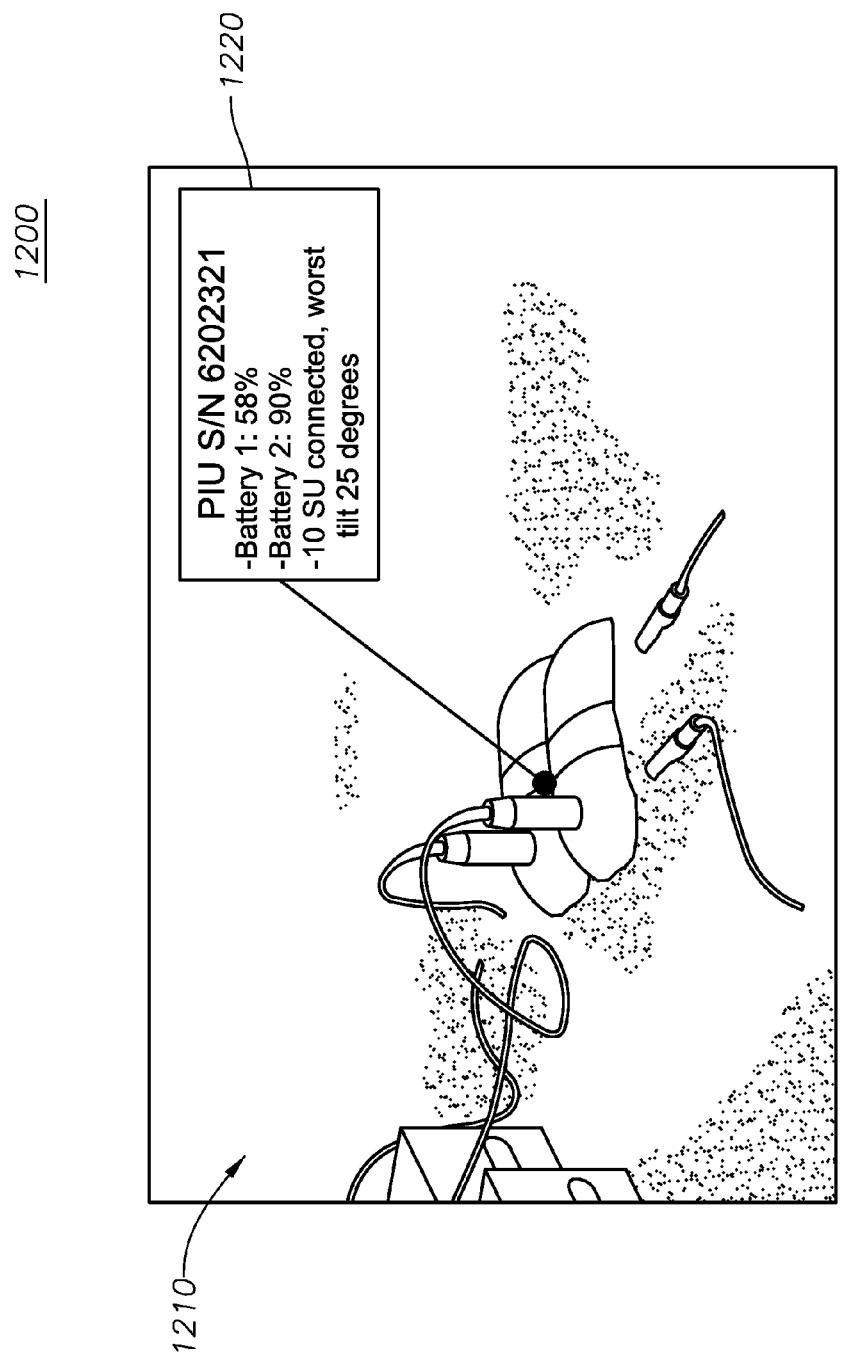
FIG. 12 illustrates a schematic of a display of an AR device in accordance with implementations of various techniques described herein.

FIG. 12 illustrates a schematic of a display 1200 of an AR device in accordance with implementations of various techniques described herein. Display 1200 of the AR device shows a view of a physical environment 1210 supplemented with various status data 1220 for a particular seismic sensor. Such status data 1220 may include battery power data, orientation data, and/or the like.

Seismic Truck Placement

In one implementation, in land environments, survey equipment such as one or more seismic trucks may be used when conducting a seismic survey. In particular, the seismic trucks may contain one or more seismic sources, such as vibrators. The seismic sources may produce sound vibrations, similar to the sources 110 of FIG. 1.1. In such an implementation, each seismic truck may operate at one or more planned positions in a physical environment to be surveyed. Accordingly, one or more AR devices may be used to place each seismic truck at its planned positions.

Figure 13:
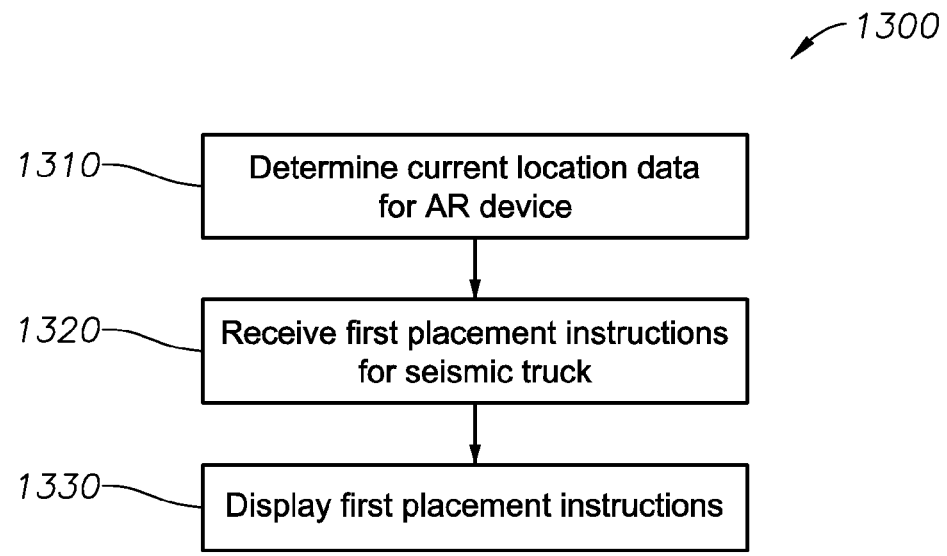
FIG. 13 illustrates a flow diagram of a method for placing a seismic truck in one or more planned positions in a physical environment using an AR device in accordance with implementations of various techniques described herein.

FIG. 13 illustrates a flow diagram of a method 1300 for placing a seismic truck in one or more planned positions in the physical environment using an AR device in accordance with implementations of various techniques described herein. In one implementation, method 1300 may be performed by the AR device. It should be understood that while method 1300 indicates a particular order of execution of operations, in some implementations, certain portions of the operations might be executed in a different order. Further, in some implementations, additional operations or blocks may be added to the method. Likewise, some operations or blocks may be omitted. In particular, the AR device may include a heads-up display, such as a windshield of the seismic truck, as similarly discussed above. Further, the AR device may be disposed on board the seismic truck.

At block 1310, current location data for the AR device may be determined. The current location data may include a GPS location of the AR device, geographic coordinates of the AR device, and/or the like. The GPS location may be determined using the GPS unit of the AR device. In one implementation, the AR device may continuously determine its current location data.

In another implementation, the current location data may be transmitted to a central computer using a wired or wireless connection. In such an implementation, the AR device may continuously transmit its current location data to the central computer.

At block 1320, one or more first placement instructions for the seismic truck may be received. In one implementation, the first placement instructions may include navigational instructions for reaching a first planned position for the seismic truck. The first placement instructions may be received from the central computer, which may generate the instructions based on the current location data received from the AR device. The navigational instructions may include directions for reaching the first planned position efficiently, such as by avoiding hazards.

In another implementation, the first placement instructions may include a GPS location of the first planned position, geographic coordinates of the first planned position, and/or the like. In another implementation, the AR device may receive updated first placement instructions based on changes to the current location data sent to the central computer. For example, if the AR device were to traverse off course, then the first placement instructions may be updated to provide new navigational instructions.

At block 1330, the one or more first placement instructions may be displayed. In particular, the first placement instructions may be displayed on a display of the AR device. In one implementation, the user may view the physical environment in which the seismic sensors are to be placed using the display of the AR. The AR device may supplement this view with the first placement instructions, which may take the form of computer-generated graphics and/or other imagery also displayed by the AR.

For example, the display of the AR device may show turn by turn instructions for reaching the planned position superimposed on the view of the physical environment. In another example, the display of the AR device may show a graphical marker superimposed on the view of the physical environment, where the graphical marker may represent the location of the planned position.

Upon placing the seismic truck at or near its first planned position, one or more seismic sources in the seismic truck may be activated. Upon completion of the activation, the AR device may transmit an updated current location data, receive second placement instructions for placing the truck at its second planned position, and subsequently display the second placement instructions, as similarly described above. The method 1300 may be repeated for respective planned positions until a sufficient number have been reached by the truck.

Seismic Streamer Status

In one implementation, in marine environments, survey equipment such as one or more seismic streamers may be used when conducting a seismic survey, as described above with respect to FIG. 5. In particular, a survey vessel may tow one or more seismic streamers behind the vessel. In towing the streamers, conditions of the streamers, vessel, and water may lead to tangling and disorientation of the streamer shape. Accordingly, one or more AR devices may be used to determine a status of the one or more seismic streamers disposed in a physical environment having at least a part of a seismic survey operation.

Figure 14:
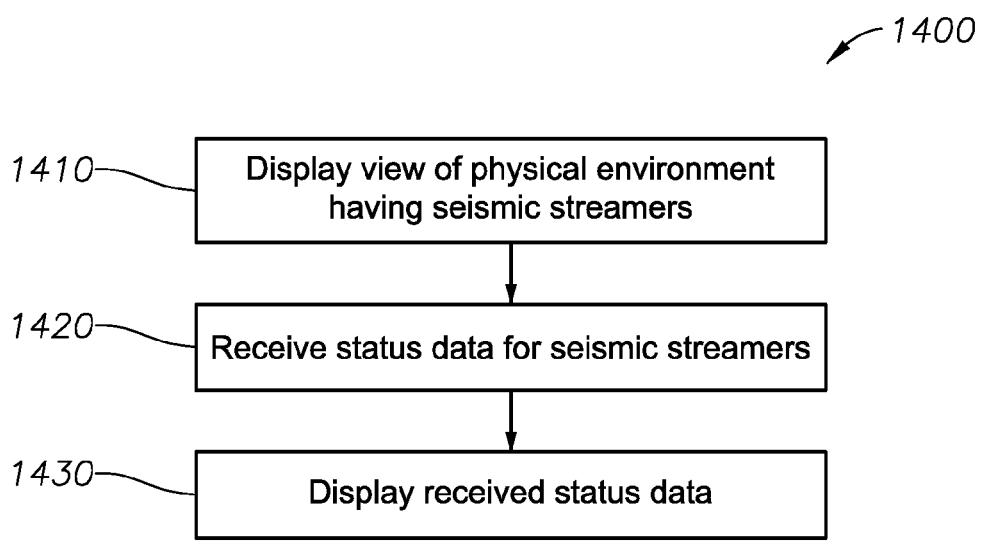
FIG. 14 illustrates a flow diagram of a method for obtaining status data for one or more seismic streamers in a physical environment using an AR device in accordance with implementations of various techniques described herein.

FIG. 14 illustrates a flow diagram of a method 1400 for obtaining status data for one or more seismic streamers in the physical environment using an AR device in accordance with implementations of various techniques described herein. In one implementation, method 1400 may be performed by the AR device. It should be understood that while method 1400 indicates a particular order of execution of operations, in some implementations, certain portions of the operations might be executed in a different order. Further, in some implementations, additional operations or blocks may be added to the method. Likewise, some operations or blocks may be omitted.

At block 1410, the AR device may display a view of the physical environment having one or more seismic streamers disposed therein. In particular, the AR device may be positioned to display a rear of the vessel towing the seismic streamers.

At block 1420, the AR device may receive status data for the one or more seismic streamers. The status data may include the estimated positions of the streamers in the water. In particular, the status data may include data on the depth, separation, placement, and/or the like of the seismic streamers. The status data may be received from a central computer disposed on board the vessel.

In particular, the central computer may generate the status data based on estimated values for position, lift, drag, and/or the like of the seismic streamers. In one implementation, these estimated values may be derived using the acoustic position system as described with respect to FIG. 5. In particular, acoustic positioning sources and receivers may be used to calculate the relative positions of the acoustic positioning sources and/or the acoustic positioning receivers in the seismic streamers. In turn, these calculated positions may be used to develop a positioning model to enable estimation of positioning of the seismic streamers, including location, depth, and/or the like.

At block 1430, the AR device may display the received status data. In one implementation, the AR device may supplement the view of the physical environment with the received status data, which may take the form of computer-generated graphics and/or other imagery also displayed by the AR. In one implementation, the received status data could be used for troubleshooting the one or more seismic sensors disposed in the physical environment.

Figure 15:
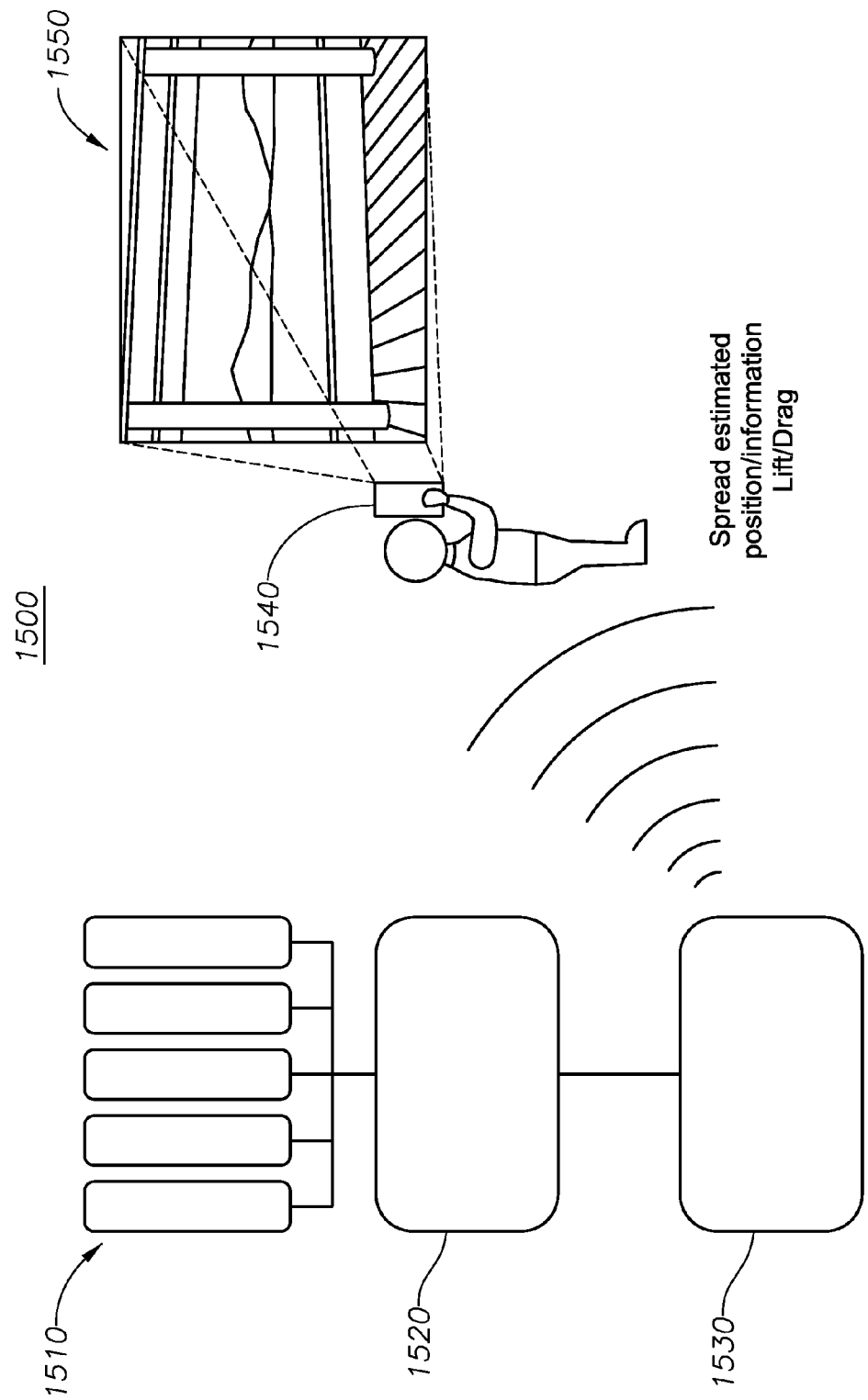
FIG. 15 illustrates a system diagram for determining a status of the one or more seismic streamers disposed in a physical environment in accordance with implementations of various techniques described herein.

FIG. 15 illustrates a system diagram for determining a status of the one or more seismic streamers disposed in a physical environment in accordance with implementations of various techniques described herein. As shown, the seismic streamers 1510 and its acoustic positioning system 1520 may be in communication with a central computer 1530 disposed aboard a vessel. The central computer may generate the status data for the seismic streamers 1510 and may transmit the status data to the AR device 1540. In turn, a display 1550 of the AR device 1540 may present a view of the physical environment to a user along with the supplemented status data.

Figure 16:
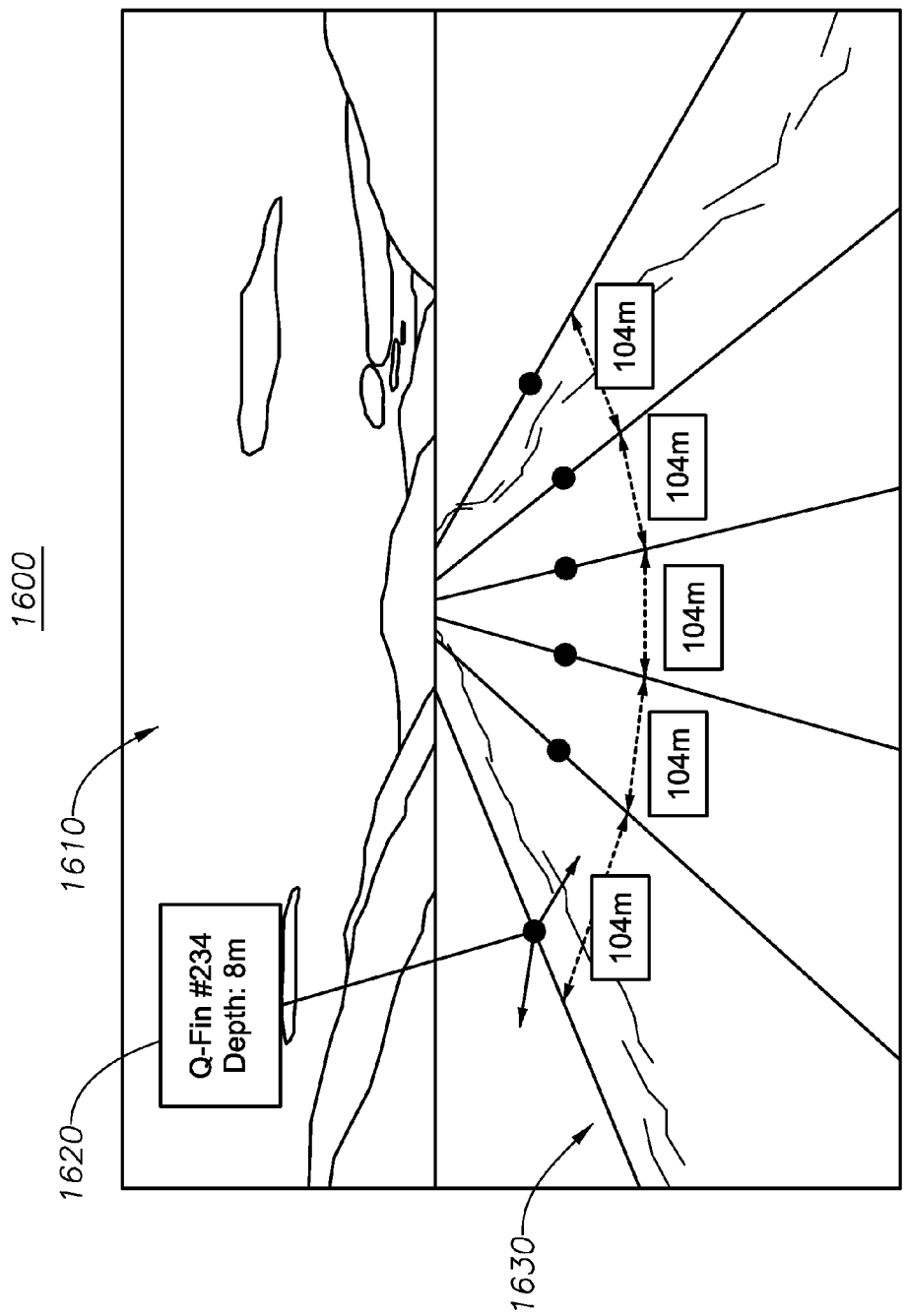
FIG. 16 illustrates a schematic diagram of a display of an AR device in accordance with implementations of various techniques described herein.

FIG. 16 illustrates a schematic diagram of a display 1600 of an AR device in accordance with implementations of various techniques described herein. Display 1600 of the AR device shows a view of a physical environment 1610 supplemented with various status data 1620 for one or more seismic streamers 1630. As shown, the status data 1620 may include data relating to depth of the streamers, separation between the streamers, and/or streamer shape.

Seismic Node Status

In another implementation, one or more AR devices may be similarly used to determine a status of the one or more seismic nodes disposed in a physical environment having at least a part of a seismic survey operation. In one implementation, a seismic node may include seismic sensors freely disposed on the surface of the water and/or along a sea bottom.

In such an implementation, the AR device aboard the vessel may receive status data for the one or more seismic nodes. The status data may include the estimated positions of the nodes in the water. In particular, the status data may include data on the depth, separation, placement, and/or the like of the seismic nodes. The status data may be received from a central computer disposed on board the vessel. As similarly discussed above with respect to FIG. 13, the AR device may display the received status data. In one implementation, the AR device may supplement the view of the physical environment with the received status data, which may take the form of computer-generated graphics and/or other imagery also displayed by the AR.

Figure 17:
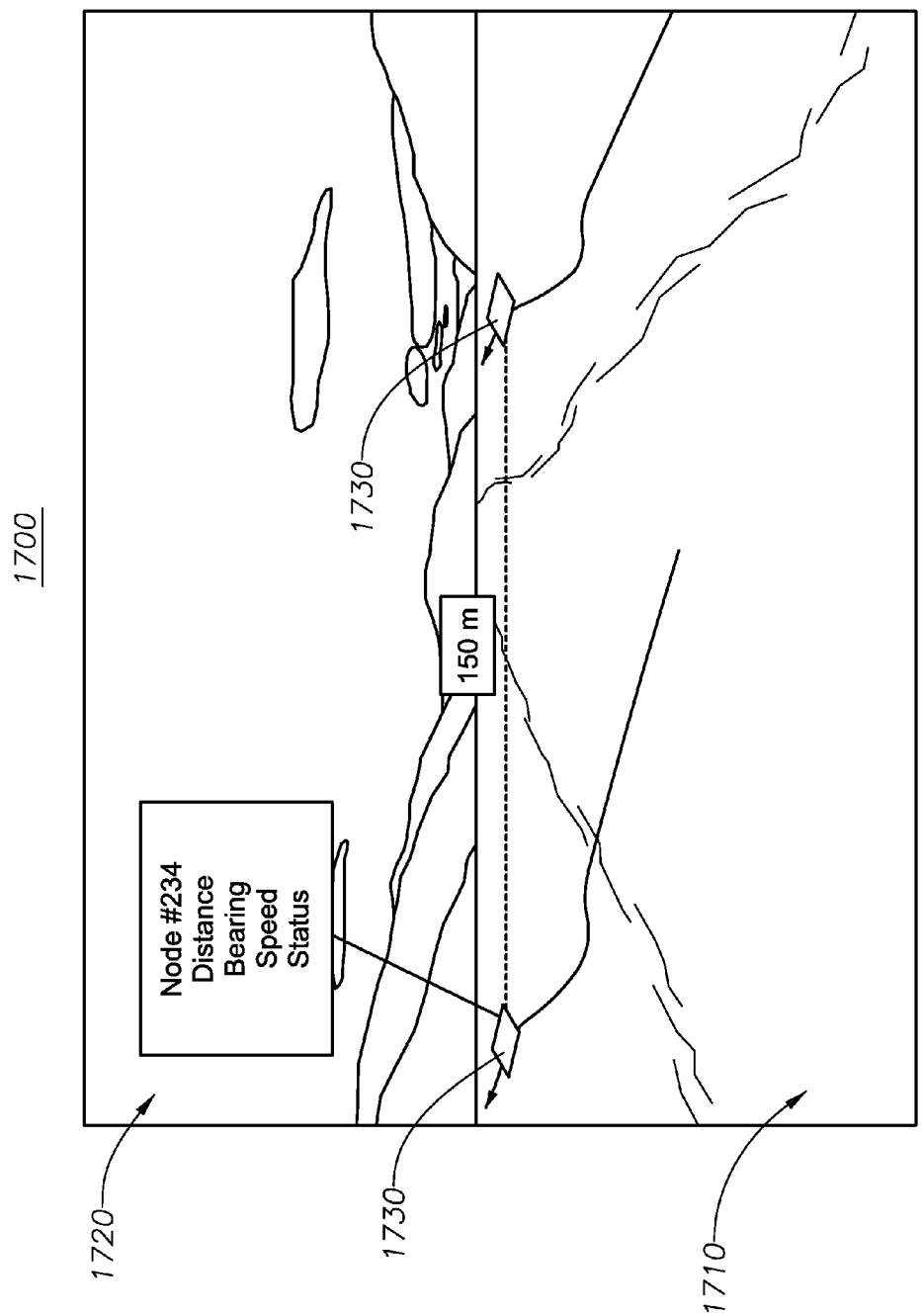
FIG. 17 illustrates a schematic diagram of a display of an AR device in accordance with implementations of various techniques described herein.

FIG. 17 illustrates a schematic diagram of a display 1700 of an AR device in accordance with implementations of various techniques described herein. Display 1700 of the AR device shows a view of a physical environment 1710 supplemented with various status data 1720 for one or more seismic nodes 1730. As shown, the status data may include data relating to identification, distance, bearing, speed, and/or the like for the seismic nodes 1730.

Water Vehicles

In one implementation, in marine environments, survey equipment such as one or more water vehicles may be used when conducting a seismic survey, as described above with respect to FIG. 6. In particular, the water vehicles may be used for seismic surveying and may include one or more sensors.

As similarly described above with respect to seismic sensors in land environments, one or more AR devices may be used to place the water vehicles at planned positions in a physical environment to be surveyed, to retrieve the one or more water vehicles disposed in the physical environment, and/or determine a status of the one or more water vehicles disposed in the physical environment.

Figure 18:
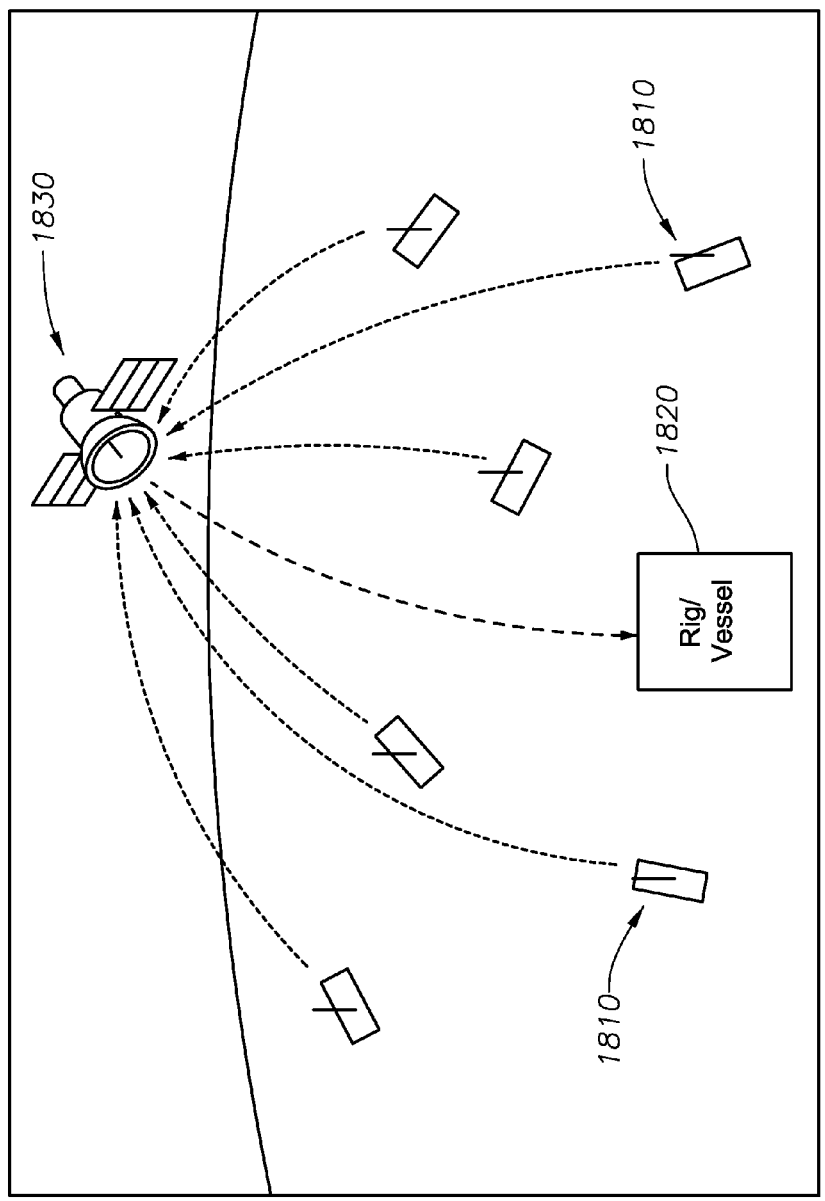
FIG. 18 illustrates a system diagram for using an AR device with one or more water vehicles disposed in a physical environment in accordance with implementations of various techniques described herein.

FIG. 18 illustrates a system diagram for using an AR device with one or more water vehicles 1810 disposed in a physical environment in accordance with implementations of various techniques described herein. With respect to retrieving and/or displaying status data for the water vehicles 1810, the water vehicles 1810 may communicate its position and/or status data with a central computer on board a rig or vessel 1820 via satellite communication 1830. In turn, the central computer may generate retrieval instructions and/or communicate the status data to an AR device disposed on the rig or vessel for display.

Computing Systems

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 19:
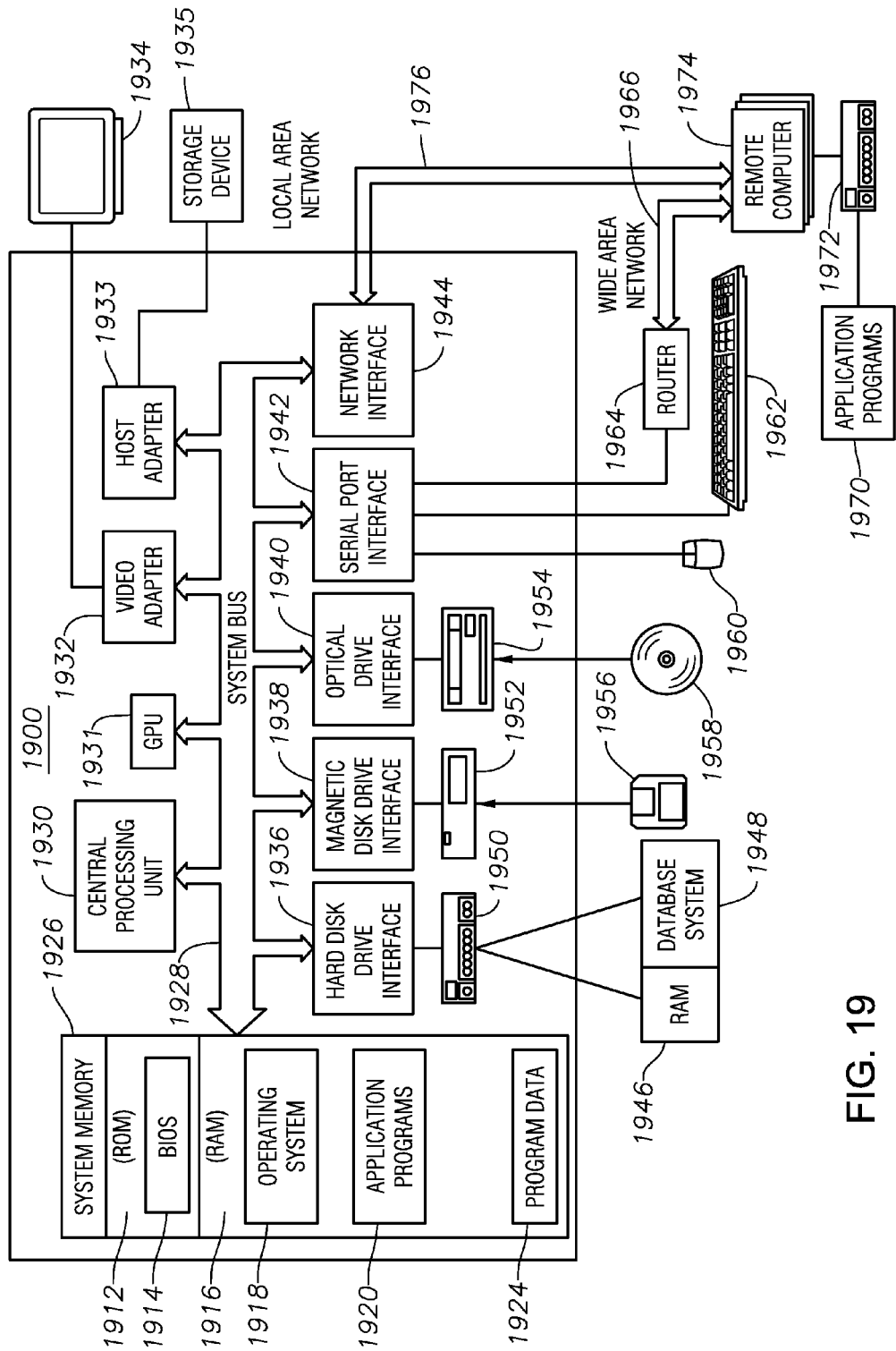
FIG. 19 illustrates a schematic diagram of a computing system in which the various technologies described herein may be incorporated and practiced.

FIG. 19 illustrates a schematic diagram of a computing system 1900 in which the various technologies described herein may be incorporated and practiced. Although the computing system 1900 may be a conventional desktop or a server computer, as described above, other computer system configurations may be used.

The computing system 1900 may include a central processing unit (CPU) 1930, a system memory 1926, a graphics processing unit (GPU) 1931 and a system bus 1928 that couples various system components including the system memory 1926 to the CPU 1930. Although one CPU is illustrated in FIG. 19, it should be understood that in some implementations the computing system 1900 may include more than one CPU. The GPU 1931 may be a microprocessor specifically designed to manipulate and implement computer graphics. The CPU 1930 may offload work to the GPU 1931. The GPU 1931 may have its own graphics memory, and/or may have access to a portion of the system memory 1926. As with the CPU 1930, the GPU 1931 may include one or more processing units, and the processing units may include one or more cores. The system bus 1928 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1926 may include a read-only memory (ROM) 1912 and a random access memory (RAM) 1946. A basic input/output system (BIOS) 1914, containing the basic routines that help transfer information between elements within the computing system 1900, such as during start-up, may be stored in the ROM 1912.

The computing system 1900 may further include a hard disk drive 1950 for reading from and writing to a hard disk, a magnetic disk drive 1952 for reading from and writing to a removable magnetic disk 1956, and an optical disk drive 1954 for reading from and writing to a removable optical disk 1958, such as a CD ROM or other optical media. The hard disk drive 1950, the magnetic disk drive 1952, and the optical disk drive 1954 may be connected to the system bus 1928 by a hard disk drive interface 1936, a magnetic disk drive interface 1938, and an optical drive interface 1940, respectively. The drives and their associated computer-readable media may provide nonvolatile storage of computer-readable instructions, data structures, program modules and other data for the computing system 1900.

Although the computing system 1900 is described herein as having a hard disk, a removable magnetic disk 1956 and a removable optical disk 1958, it should be appreciated by those skilled in the art that the computing system 1900 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1900. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1900 may also include a host adapter 1933 that connects to a storage device 1935 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 1950, magnetic disk 1956, optical disk 1958, ROM 1912 or RAM 1916, including an operating system 1918, one or more application programs 1920, program data 1924, and a database system 1948. The application programs 1920 may include various mobile applications ("apps") and other applications configured to perform various methods and techniques described herein. The operating system 1918 may be any suitable operating system that may control the operation of a networked personal or server computer, such as Windows® XP, Mac OS® X, Unix-variants (e.g., Linux® and BSD®), and the like.

A user may enter commands and information into the computing system 1900 through input devices such as a keyboard 1962 and pointing device 1960. Other input devices may include a microphone, joystick, game pad, satellite dish, scanner, or the like. These and other input devices may be connected to the CPU 1930 through a serial port interface 1942 coupled to system bus 1928, but may be connected by other interfaces, such as a parallel port, game port or a universal serial bus (USB). A monitor 1934 or other type of display device may also be connected to system bus 1928 via an interface, such as a video adapter 1932. In addition to the monitor 1934, the computing system 1900 may further include other peripheral output devices such as speakers and printers.

Further, the computing system 1900 may operate in a networked environment using logical connections to one or more remote computers 1974. The logical connections may be any connection that is commonplace in offices, enterprise-wide computer networks, intranets, and the Internet, such as local area network (LAN) 1976 and a wide area network (WAN) 1966. The remote computers 1974 may be another a computer, a server computer, a router, a network PC, a peer device or other common network node, and may include many of the elements describes above relative to the computing system 1900. The remote computers 1974 may also each include application programs 1970 similar to that of the computer action function.

When using a LAN networking environment, the computing system 1900 may be connected to the local network 1976 through a network interface or adapter 1944. When used in a WAN networking environment, the computing system 1900 may include a router 1964, wireless router or other means for establishing communication over a wide area network 1966, such as the Internet. The router 1964, which may be internal or external, may be connected to the system bus 1928 via the serial port interface 1942. In a networked environment, program modules depicted relative to the computing system 1900, or portions thereof, may be stored in a remote memory storage device 1972. It will be appreciated that the network connections shown are merely examples and other means of establishing a communications link between the computers may be used.

The network interface 1944 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 1974.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The computing system 1900 may be located at a data center remote from the survey region. The computing system 1900 may be in communication with the receivers (either directly or via a recording unit, not shown), to receive signals indicative of the reflected seismic energy. These signals, after conventional formatting and other initial processing, may be stored by the computing system 1900 as digital data in the disk storage for subsequent retrieval and processing in the manner described above. In one implementation, these signals and data may be sent to the computing system 1900 directly from sensors, such as geophones, hydrophones and the like. When receiving data directly from the sensors, the computing system 1900 may be described as part of an in-field data processing system. In another implementation, the computing system 1900 may process seismic data already stored in the disk storage. When processing data stored in the disk storage, the computing system 1900 may be described as part of a remote data processing center, separate from data acquisition. The computing system 1900 may be configured to process data as part of the in-field data processing system, the remote data processing system or a combination thereof.

Those with skill in the art will appreciate that any of the listed architectures, features or standards discussed above with respect to the example computing system 1900 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

The foregoing description, for purpose of explanation, has been described with reference to specific implementations. However, the illustrative discussions above are not intended to be exhaustive or to limit the above-described implementations to the precise forms disclosed. Many modifications and variations are possible in view of the above teachings. The implementations were chosen and described in order to explain the principles of the above-described implementations and their practical applications, to thereby enable others skilled in the art to utilize the above-described implementations with various modifications as are suited to the particular use contemplated.

What is claimed is:

1. A method, comprising:
   determining current location data of an augmented reality (AR) device in a physical environment;
   receiving one or more placement instructions for a first seismic survey equipment in the physical environment based on the current location data; and
   displaying the one or more placement instructions in combination with a view of the physical environment on the AR device.

2. The method of claim 1, wherein displaying the placement instructions comprises superimposing the one or more placement instructions on the view of the physical environment, and wherein the one or more placement instructions comprise computer-generated graphics.

3. The method of claim 1, wherein the placement instructions comprise one or more navigational instructions for reaching one or more planned positions of the first seismic survey equipment.

4. The method of claim 1, further comprising:
   transmitting the current location data to a central computer; and
   receiving the placement instructions from the central computer, wherein the one or more placement instructions are based on the current location data and one or more planned positions of the first seismic survey equipment.

5. The method of claim 1, wherein the first seismic survey equipment comprises one or more seismic sensors, one or more seismic trucks, or one or more water vehicles.

6. The method of claim 1, wherein the AR device comprises a substantially transparent display, and wherein the view comprises a live view of the physical environment.

7. The method of claim 1, further comprising:
- determining an updated current location data for the AR device in the physical environment;
- receiving one or more placement instructions for a second seismic equipment in the physical environment based on the updated current location data; and
- displaying the one or more placement instructions for the second seismic equipment in combination with the view of the physical environment.

8. A method, comprising:
- determining current location data of an augmented reality (AR) device in a physical environment;
- receiving data for one or more planned positions for one or more seismic survey equipment in the physical environment;
- generating one or more placement instructions for the one or more seismic survey equipment based on the current location data and the data for the one or more planned positions; and
- displaying the one or more placement instructions in combination with a view of the physical environment on the AR device.

9. The method of claim 8, wherein the data for the one or more planned positions is received from a central computer, and wherein the data for the one or more planned positions comprises one or more global position system (GPS) locations for the planned positions, geographic coordinates for the planned positions, or combinations thereof.

10. A method, comprising:
- determining current location data of an augmented reality (AR) device in a physical environment;
- receiving position data for one or more seismic survey equipment disposed in the physical environment;
- generating one or more retrieval data for the one or more seismic survey equipment based on the position data and the current location data; and
- displaying the retrieval data in combination with a view of the physical environment.

11. The method of claim 10, wherein the retrieval data comprise navigational instructions to the one or more seismic survey equipment, survey equipment data, or combinations thereof.

12. The method of claim 10, wherein receiving the position data comprises receiving the position data directly from the one or more seismic survey equipment using a wireless connection, from a central computer, or from a storage media of the AR device.

\* \* \* \* \*